(12) United States Patent
Choi et al.

(10) Patent No.: US 12,449,156 B2
(45) Date of Patent: Oct. 21, 2025

(54) VENTILATION APPARATUS AND VENTILATION SYSTEM INCLUDING THE SAME

(71) Applicant: SAMSUNG ELECTRONICS CO., LTD., Suwon-si (KR)

(72) Inventors: Taesung Choi, Suwon-si (KR); Kyunghoon Kim, Suwon-si (KR); Seonuk Na, Suwon-si (KR); Hyeongjoon Seo, Suwon-si (KR); Jaehyoung Sim, Suwon-si (KR); Eomji Jang, Suwon-si (KR); Sungjune Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 691 days.

(21) Appl. No.: 17/843,005

(22) Filed: Jun. 17, 2022

(65) Prior Publication Data

US 2023/0055517 A1   Feb. 23, 2023

Related U.S. Application Data

(63) Continuation of application No. PCT/KR2022/008116, filed on Jun. 9, 2022.

(30) Foreign Application Priority Data

Aug. 18, 2021   (KR) .................. 10-2021-0108916

(51) Int. Cl.
*F24F 12/00* (2006.01)
*F24F 7/08* (2006.01)
(Continued)

(52) U.S. Cl.
CPC ............. *F24F 12/006* (2013.01); *F24F 7/08* (2013.01); *F24F 13/20* (2013.01); *F24F 13/222* (2013.01);
(Continued)

(58) Field of Classification Search
CPC .......... F24F 12/006; F24F 7/08; F24F 13/222; F24F 13/28; F24F 13/30; F24F 3/147; F24F 13/20
(Continued)

(56) References Cited

U.S. PATENT DOCUMENTS 3,236,061 A * 2/1966 Wells ................ F24F 13/22
                                                165/48.1
5,207,074 A * 5/1993 Cox .................. F28B 1/06
                                                62/515
(Continued)

FOREIGN PATENT DOCUMENTS

CN    207179948 U  *  4/2018
CN    109682006 A  *  4/2019 ............ F24F 12/006
(Continued)

OTHER PUBLICATIONS

International Search Report dated Sep. 21, 2022 for International Application No. PCT/KR2022/008116.
(Continued)

*Primary Examiner* — Edelmira Bosques
*Assistant Examiner* — Frances F. Hamilton
(74) *Attorney, Agent, or Firm* — STAAS & HALSEY LLP

(57) ABSTRACT

A ventilation apparatus including a housing having an inlet flow path to discharge outdoor air, to an indoor space through a first outlet, and an outlet flow path to discharge indoor air, to an outdoor space through a second outlet, a total enthalpy heat exchanger in which air flowing along the inlet flow path and air flowing along the outlet flow path exchange heat, and a heat exchanger to remove moisture in the air flowing along the inlet flow path. The housing including a connection flow path connecting the inlet flow path to the outlet flow path, and a connection path opening
(Continued)

and closing unit configured to selectively open and close the connection flow path. The connection flow path to allow indoor air, to pass through the heat exchanger and flow to the first outlet while preventing the indoor air from flowing to the total enthalpy heat exchanger.

13 Claims, 13 Drawing Sheets

(51) Int. Cl.
    *F24F 13/20*     (2006.01)
    *F24F 13/22*     (2006.01)
    *F24F 13/28*     (2006.01)
    *F24F 13/30*     (2006.01)
    *F24F 1/0358*     (2019.01)
    *F24F 13/14*     (2006.01)

(52) U.S. Cl.
    CPC .............. *F24F 13/28* (2013.01); *F24F 13/30* (2013.01); *F24F 1/0358* (2019.02); *F24F 2012/007* (2013.01); *F24F 13/14* (2013.01)

(58) Field of Classification Search
    USPC ......................................................... 454/355
    See application file for complete search history.

(56) References Cited

U.S. PATENT DOCUMENTS

| | | | | |
|---|---|---|---|---|
| 6,901,766 | B1* | 6/2005 | Jin | F24F 13/222 |
| | | | | 62/286 |
| 10,876,749 | B2 | 12/2020 | Jin et al. | |
| 11,614,242 | B2 | 3/2023 | Jin et al. | |
| 2002/0134087 | A1* | 9/2002 | Urch | F24F 3/147 |
| | | | | 62/271 |
| 2004/0250841 | A1* | 12/2004 | Kimbrough | B08B 3/04 |
| | | | | 134/115 R |
| 2007/0169498 | A1* | 7/2007 | Rios | F24F 13/222 |
| | | | | 62/286 |
| 2011/0011112 | A1* | 1/2011 | Goel | F24F 8/22 |
| | | | | 29/890.03 |
| 2012/0308214 | A1* | 12/2012 | Tyburk | F24F 1/032 |
| | | | | 392/407 |
| 2019/0242595 | A1* | 8/2019 | Eplee | F24F 13/30 |
| 2019/0293319 | A1 | 9/2019 | Okeya et al. | |
| 2020/0025395 | A1* | 1/2020 | Zhou | F24F 13/20 |
| 2020/0149765 | A1* | 5/2020 | Long | F24F 11/32 |
| 2020/0208872 | A1* | 7/2020 | Lanning | F24F 13/222 |
| 2020/0378645 | A1* | 12/2020 | Doi | F24F 11/67 |
| 2023/0175726 | A1* | 6/2023 | Cho | F24F 13/28 |
| | | | | 165/54 |

FOREIGN PATENT DOCUMENTS

| | | | | |
|---|---|---|---|---|
| EP | 1376023 | B1 * | 11/2006 | ........... F24F 12/006 |
| GB | 2561989 | B * | 10/2020 | ........... F24F 12/006 |
| JP | 4022549 | | 12/2007 | |
| JP | 6305525 | | 4/2018 | |
| KR | 20060026733 | A * | 3/2006 | ............. F24F 13/20 |
| KR | 10-0624708 | | 9/2006 | |
| KR | 100637667 | B1 * | 10/2006 | |
| KR | 10-0657808 | | 12/2006 | |
| KR | 10-0700191 | | 3/2007 | |
| KR | 10-2018-0080587 | | 7/2018 | |
| KR | 10-2018-0089623 | | 8/2018 | |
| KR | 10-2092783 | | 5/2020 | |
| KR | 10-2020-0079060 | | 7/2020 | |
| KR | 10-2020-0092221 | | 8/2020 | |
| KR | 10-2147675 | | 8/2020 | |
| KR | 10-2180663 | | 11/2020 | |
| KR | 10-2185491 | | 12/2020 | |
| KR | 10-2232441 | | 3/2021 | |
| KR | 10-2254003 | | 5/2021 | |
| KR | 10-2021-0098023 | | 8/2021 | |
| WO | WO-2018109844 | A1 * | 6/2018 | .......... F24F 11/0001 |

OTHER PUBLICATIONS

Written Opinion of the International Searching Authority dated Sep. 21, 2022 for International Application No. PCT/KR2022/008116.
Extended European Search Report issued Oct. 2, 2024 for European Patent Application No. 22858584.0.
European Office Action dated May 6, 2025 for European Application No. 22858584.0.

* cited by examiner

1A(1)

FIG. 12
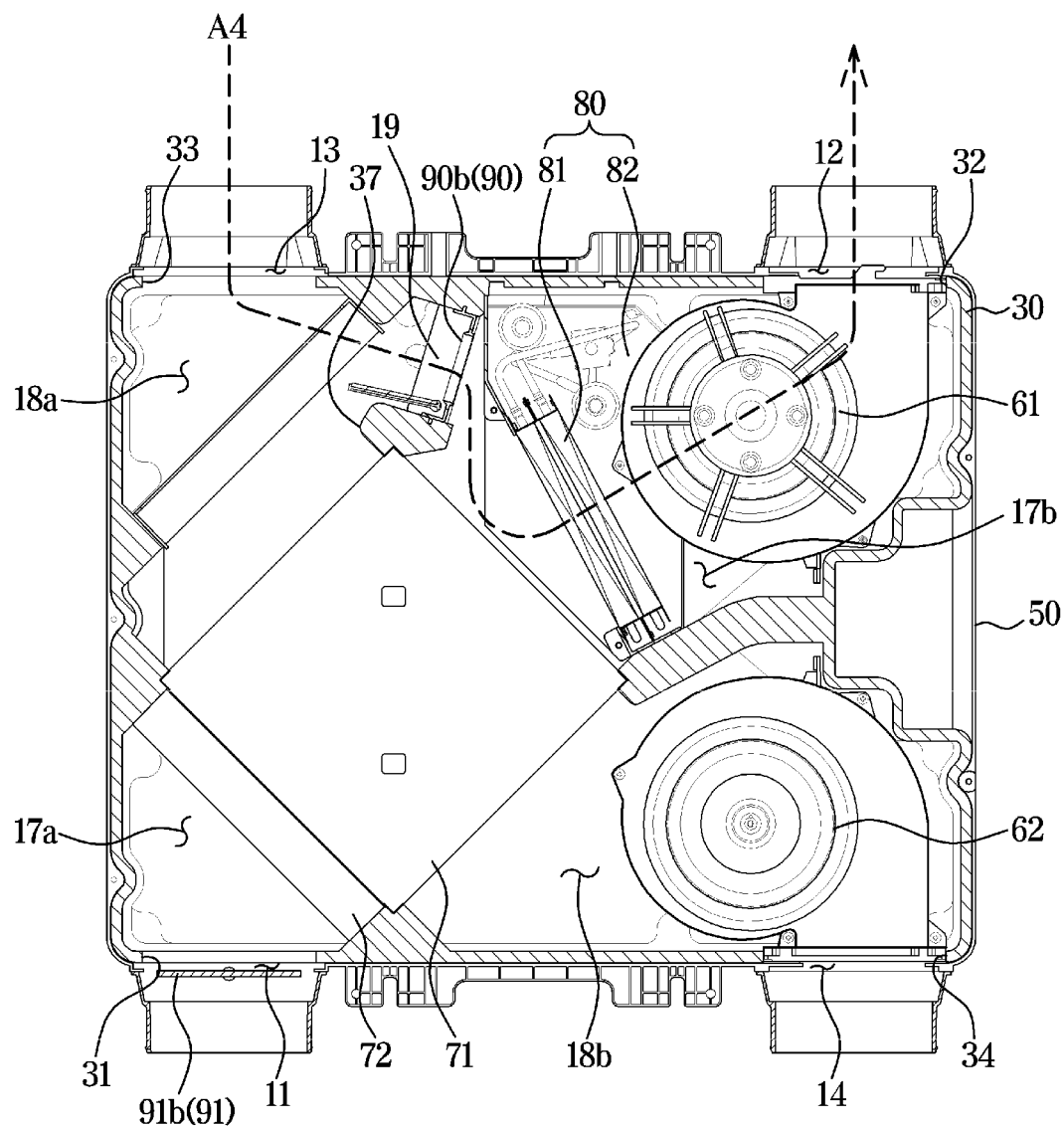
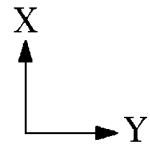

1A(1)

VENTILATION APPARATUS AND VENTILATION SYSTEM INCLUDING THE SAME

CROSS-REFERENCE TO RELATED APPLICATION(S)

This application is a continuation application, under 35 U.S.C. § 111(a), of International Application No. PCT/KR2022/008116, filed on Jun. 9, 2022, which claims priority to Korean Patent Application No. 10-2021-0108916, filed on Aug. 18, 2021, in the Korean Intellectual Property Office, the disclosure of which is incorporated by reference herein in its entirety

BACKGROUND

1. Field

The disclosure relates to a ventilation apparatus, and more particularly, to a ventilation apparatus configured to provide comfortable air and a ventilation system including the same.

2. Description of Related Art

A ventilation apparatus is a device configured to supply outdoor air to a room or exchange indoor air with outdoor air to ventilate an indoor space.

Conventional ventilation apparatuses have only a function of controlling an indoor temperature and humidity through total heat exchange that occurs between outdoor air and indoor air while the outdoor air and indoor air pass through a total enthalpy heat exchanger. Accordingly, the dehumidification of the outdoor air supplied to the room is incomplete, and it is difficult to maintain the indoor temperature and humidity in a comfortable state.

SUMMARY

Additional aspects of the disclosure will be set forth in part in the description which follows and, in part, will be obvious from the description, or may be learned by practice of the disclosure.

In accordance with an aspect of the disclosure, a ventilation apparatus comprising a housing including an inlet flow path provided to guide outdoor air, introduced through a first inlet, to flow to an indoor space through a first outlet, an outlet flow path provided to guide indoor air, introduced through a second inlet, to flow to an outdoor space through a second outlet, a connection flow path provided to connect the inlet flow path to the outlet flow path, and a connection path opening and closing unit configured to selectively open and close the connection flow path, a total enthalpy heat exchanger provided to exchange heat with air flowing along the inlet flow path and air flowing along the outlet flow path with each other, a heat exchanger configured to remove moisture in the air flowing along the inlet flow path, wherein the connection flow path is provided to allow the indoor air, introduced through the second inlet, to pass through the heat exchanger and flow to the first outlet while preventing the indoor air from flowing to the total enthalpy heat exchanger.

The housing may include a first inlet chamber forming a portion of the inlet flow path and positioned between the first inlet and the total enthalpy heat exchanger; a second inlet chamber forming another portion of the inlet flow path and positioned between the first outlet and the total enthalpy heat exchanger; a first outlet chamber forming a portion of the outlet flow path and positioned between the second inlet and the total enthalpy heat exchanger; and a second outlet chamber forming another portion of the outlet flow path and positioned between the second outlet and the total enthalpy heat exchanger, wherein the heat exchanger may be arranged in the second inlet chamber.

The connection flow path may be provided to connect the first outlet chamber to the second inlet chamber.

The ventilation apparatus may further include a filter provided to collect foreign substances in the outdoor air introduced through the first inlet, and arranged to face an intake end of the total enthalpy heat exchanger.

The connection flow path may be provided to allow indoor air; which is introduced through the second inlet, to pass through the heat exchanger and flow to the first outlet while preventing the indoor air from flowing to the total enthalpy heat exchanger and the filter.

The ventilation apparatus may further include a first blower provided along the inlet flow path to move the outdoor air, and a second blower provided along the outlet flow path to move the indoor air wherein the first blower may be arranged in the second inlet chamber, and the second blower is arranged in the second outlet chamber.

The housing further comprises a first inlet opening and closing unit configured to open and close the first inlet wherein the first inlet opening and closing unit closes the first inlet in response to the connection path opening and closing unit opening.

The second blower may not be driven in response to the connection path opening and closing unit opening.

The ventilation apparatus may further include a drain tray provided to collect condensed water generated by the heat exchanger, and the housing may further comprises a first housing comprising a first hole formed asymmetrically on a surface with respect to a center line of the one surface extending along a long axis direction or a short axis direction of the surface of the housing, the first hole provided to allow the drain tray and the total enthalpy heat exchanger to be drawn out to an outside of the housing, and a second housing couplable to the first housing in an up and down direction, and comprising a second hole arranged on another surface of the housing and formed in a shape corresponding to the first hole in the up and down direction.

At least a portion of the second inlet chamber may be formed by the other surface of the housing, and at least a portion of the first outlet chamber may be formed by the other surface of the housing, the housing may further include a partition wall arranged between the second inlet chamber and the first outlet chamber, and provided to define the second inlet chamber and the first outlet chamber inside the housing. The connection path opening and closing unit may be arranged on the partition wall.

The total enthalpy heat exchanger may be arranged adjacent to an one side of the housing rather than another side of the housing on a center of the one side and the other side of the housing with respect to a center line extending along a direction in which the one side and the other side of the housing extend.

The first hole may include a first region through which the total enthalpy heat exchanger is drawn out, and a second region through which the drain tray is drawn out wherein the first region may be arranged adjacent to the one side of the housing rather than the other side of the housing on the center of the one side and the other side of the housing with respect to the center line extending along the direction in which the one side and the other side of the housing extend.

The second inlet chamber is provided to have a larger internal space than the first inlet chamber, the first outlet chamber, and the second outlet chamber.

The first housing may include a first inlet portion forming a portion of the first inlet, a first outlet portion forming a portion of the first outlet, a second inlet portion forming a portion of the second inlet, and a second outlet portion forming a portion of the second outlet, and the second housing comprises a first inlet portion forming another portion of the first inlet, a first outlet portion forming another portion of the first outlet, a second inlet portion forming another portion of the second inlet, and a second outlet portion forming another portion of the second outlet, wherein first outlet portion of the first housing and the first outlet forming portion of the second housing are formed symmetrically along the up and down direction, the first inlet portion of the first housing and the first inlet portion of the second housing are formed symmetrically along the up and down direction, the second outlet portion of the first housing and the second outlet portion of the second housing may be formed symmetrically along the up and down direction, and the second inlet portion of the first housing and the second inlet portion of the second housing may be formed symmetrically along the up and down direction.

In accordance with another aspect of the disclosure, a ventilation system includes an outdoor unit, and a ventilation apparatus connected to the outdoor unit so as to supply air to an indoor space. The ventilation includes a housing including an inlet flow path provided to discharge outdoor air, which is introduced through a first inlet, to an indoor space through a first outlet, and an outlet flow path provided to discharge indoor air, which is introduced through a second inlet, to an outdoor space through a second outlet, a total enthalpy heat exchanger in which air flowing on the inlet flow path and air flowing on the outlet flow path exchange heat with each other, and a heat exchanger configured to remove moisture in the air flowing on the inlet flow path. The housing includes a connection flow path provided to connect the inlet flow path to the outlet flow path, and a connection path opening and closing unit configured to selectively open and close the connection flow path. The connection flow path is provided to allow indoor air, which is introduced through the second inlet, to pass through the heat exchanger and flow to the first outlet while preventing the indoor air from flowing to the total enthalpy heat exchanger.

The housing may include a first inlet chamber provided to form a portion of the inlet flow path and formed between the first inlet and the total enthalpy heat exchanger, a second inlet chamber provided to form other portion of the inlet flow path and formed between the first outlet and the total enthalpy heat exchanger, a first outlet chamber provided to form a portion of the outlet flow path and formed between the second inlet and the total enthalpy heat exchanger, and a second outlet chamber provided to form other portion of the outlet flow path and formed between the second outlet and the total enthalpy heat exchanger. The heat exchanger may be arranged in the second inlet chamber.

The connection flow path may be provided to connect the first outlet chamber to the second inlet chamber.

The ventilation system may further include a filter provided to collect foreign substances in the outdoor air introduced through the first inlet, and arranged to face an intake end of the total enthalpy heat exchanger provided to communicate with the first inlet. The connection flow path may be provided to allow indoor air, which is introduced through the second inlet, to pass through the heat exchanger and flow to the first outlet while preventing the indoor air from flowing to the total enthalpy heat exchanger and the filter.

In accordance with another aspect of the disclosure, a ventilation apparatus includes a housing including an inlet flow path provided to discharge outdoor air, which is introduced through a first inlet, to an indoor space through a first outlet, an outlet flow path provided to discharge indoor air, which is introduced through a second inlet, to an outdoor space through a second outlet, and a connection flow path provided to connect the inlet flow path to the outlet flow path, a total enthalpy heat exchanger in which air flowing on the inlet flow path and air flowing on the outlet flow path exchange heat with each other, and a heat exchanger configured to remove moisture in the air flowing on the inlet flow path. The housing is provided to define a first inlet chamber formed between the first inlet and the total enthalpy heat exchanger, a second inlet chamber formed between the first outlet and the total enthalpy heat exchanger, a first outlet chamber formed between the second inlet and the total enthalpy heat exchanger, and a second outlet chamber formed between the second outlet and the total enthalpy heat exchanger inside the housing. The heat exchanger is arranged in the second inlet chamber. The ventilation apparatus is configured to be driven in one mode between a first mode in which air, which is introduced to the housing through the first inlet, is moved to the first outlet through the first inlet chamber, the total enthalpy heat exchanger, and the second inlet chamber, and a second mode in which air, which is introduced to the housing through the second inlet, is moved to the first outlet through the first outlet chamber, the connection flow path, and the second inlet chamber.

BRIEF DESCRIPTION OF THE DRAWINGS

These and/or other aspects of the disclosure will become apparent and more readily appreciated from the following description of embodiments, taken in conjunction with the accompanying drawings of which:

FIG. 12 is a view schematically illustrating an air flow in a mode different from the air flow, shown in FIG. 11, of the first type-ventilation apparatus shown in FIG. 1.

DETAILED DESCRIPTION

Figure 1:
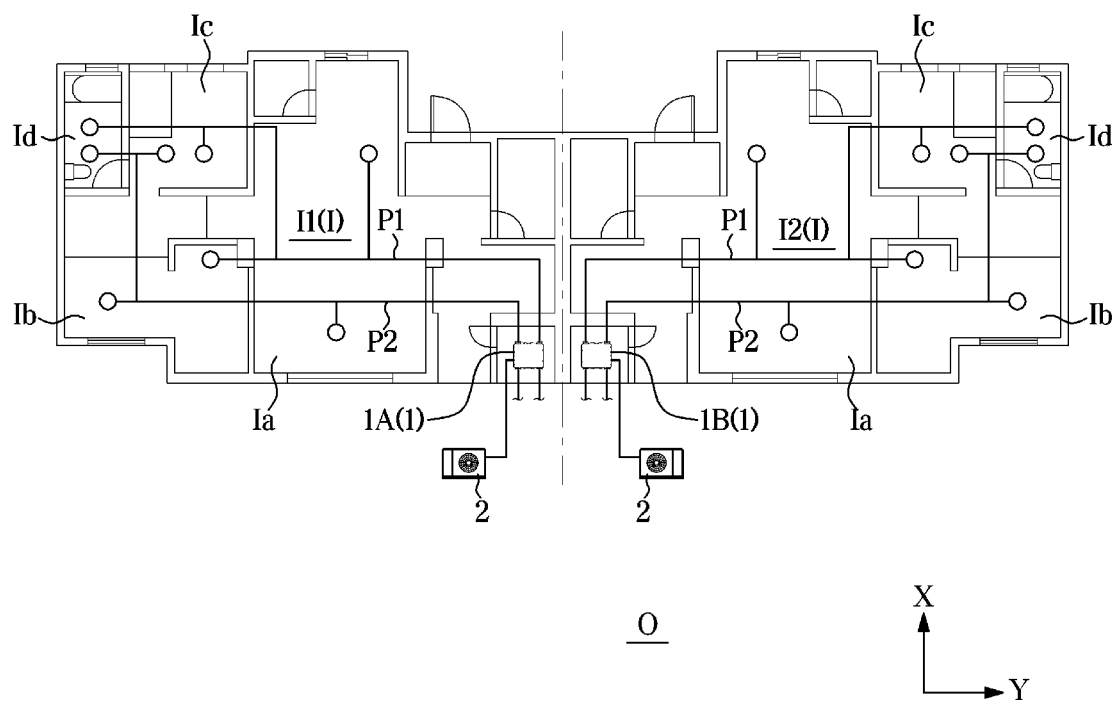
FIG. 1 is a view illustrating a ventilation system according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function. The shapes and sizes of elements in the drawings may be exaggerated for the clear description.

It will be understood that when an element is referred to as being "connected" another element, it can be directly or indirectly connected to the other element, wherein the indirect connection includes "connection via a wireless communication network"

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "upper portion", "lower portion" and the like may be defined by the drawings, but the shape and the location of the component is not limited by the term.

The disclosure will be described more fully hereinafter with reference to the accompanying drawings.

Therefore, it is an aspect of the disclosure to provide a ventilation apparatus capable of adjusting a humidity of air supplied to a room in a comfortable state, and a ventilation system including the same.

It is another aspect of the disclosure to provide a ventilation apparatus, to be required to be bilateral symmetry, capable of being bilateral-symmetrically arranged with the same configuration, and a ventilation system including the same.

It is another aspect of the disclosure to provide a ventilation apparatus capable of circulating indoor air as well as outdoor air to control a humidity of air, which is supplied to a room, in a comfortable state, and a ventilation system including the same.

Figure 2:
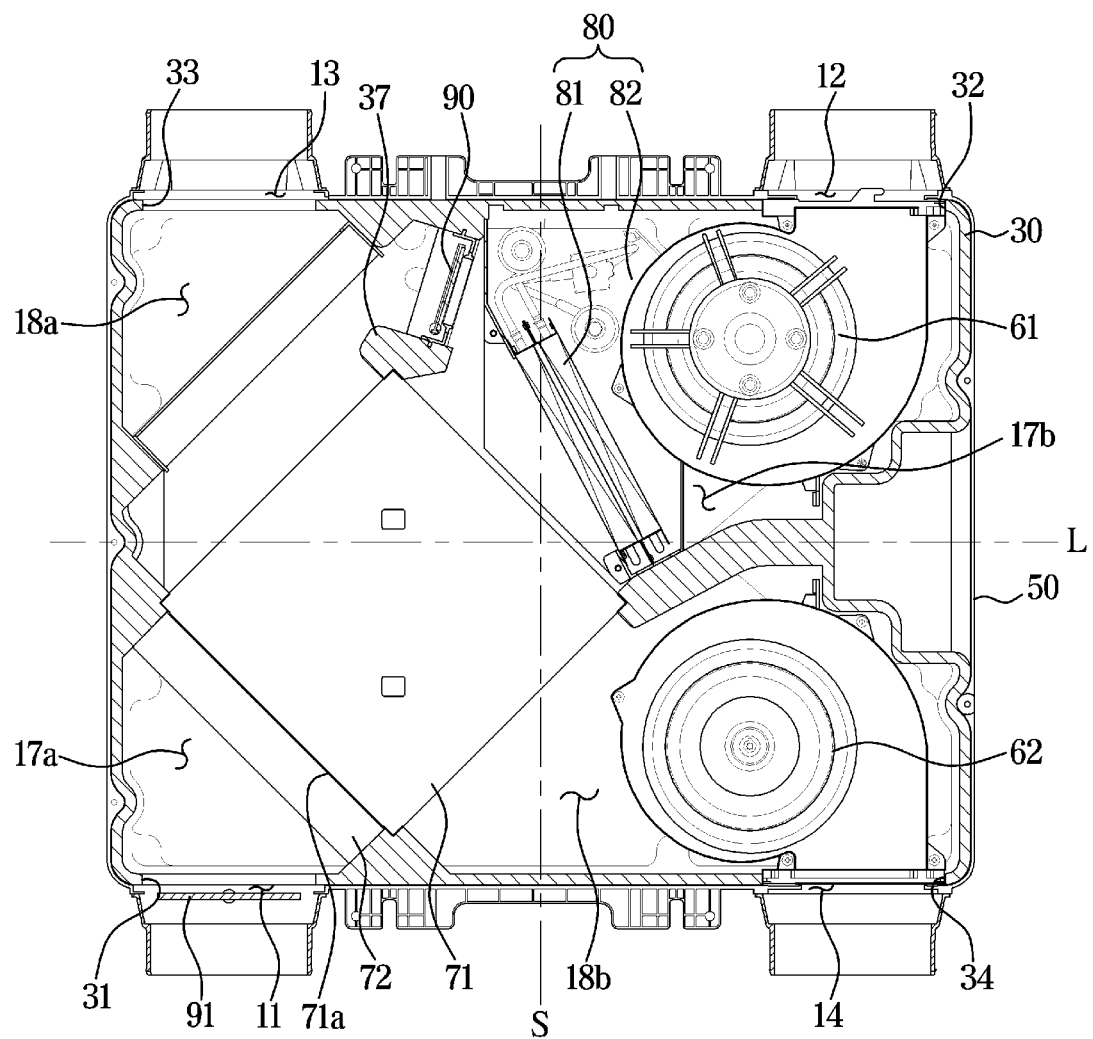
FIG. 2 is a view illustrating a ventilation apparatus shown in FIG. 1, in a state in which some components of a first type-ventilation apparatus are removed, from the top to the bottom.
Figure 3:
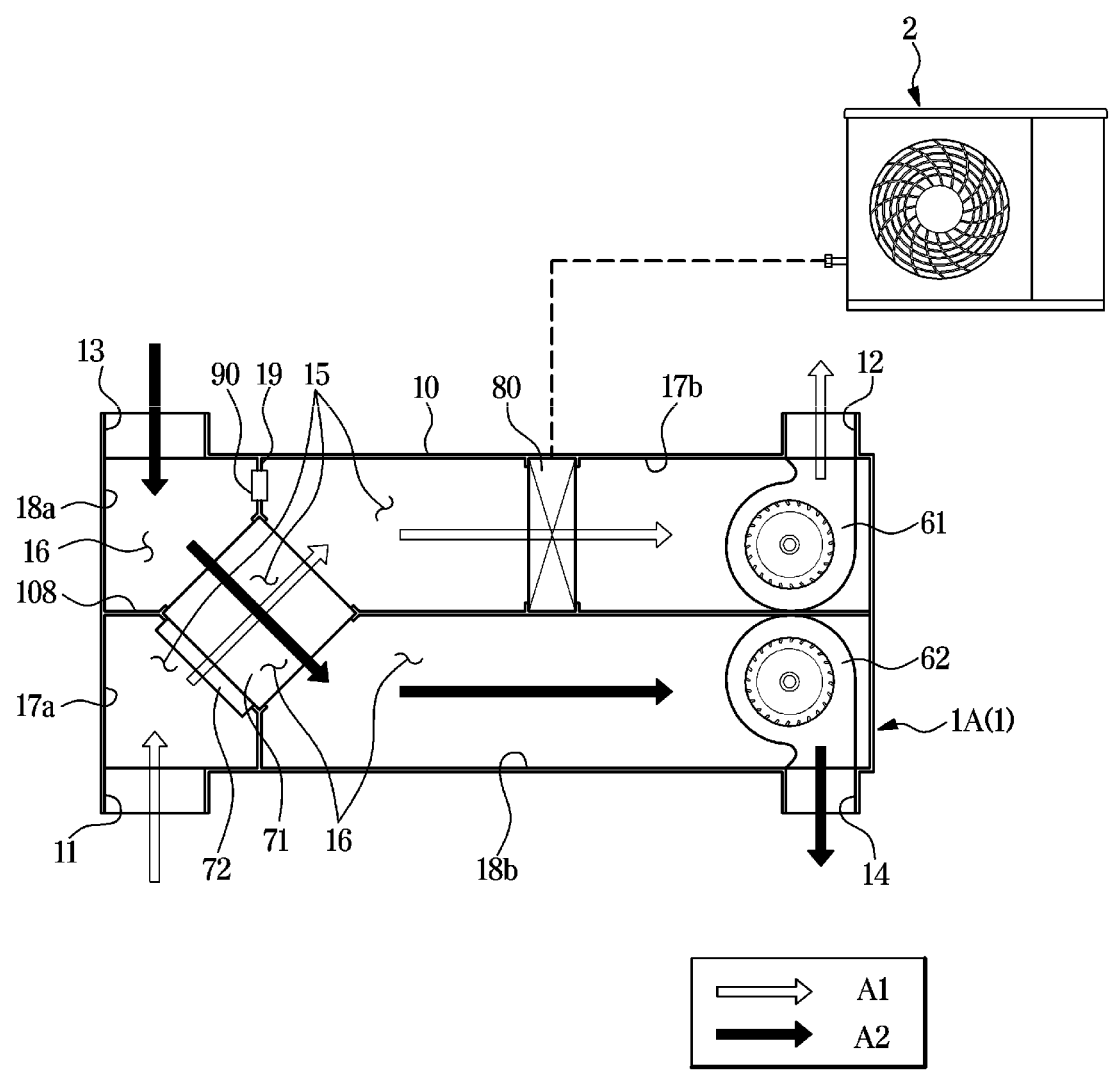
FIG. 3 is a view schematically illustrating an air flow of the ventilation system according to an embodiment of the disclosure.
Figure 4:
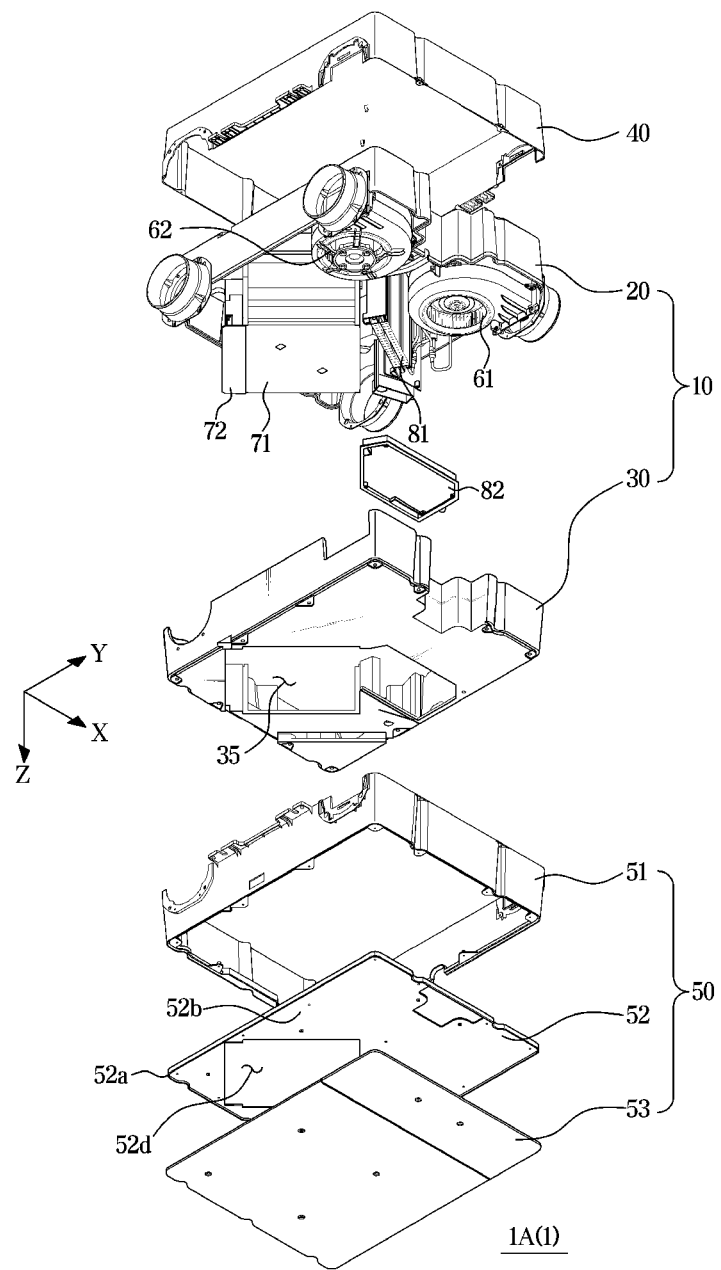
FIG. 4 is an exploded perspective view illustrating the first type-ventilation apparatus shown in FIG. 1.
Figure 5:
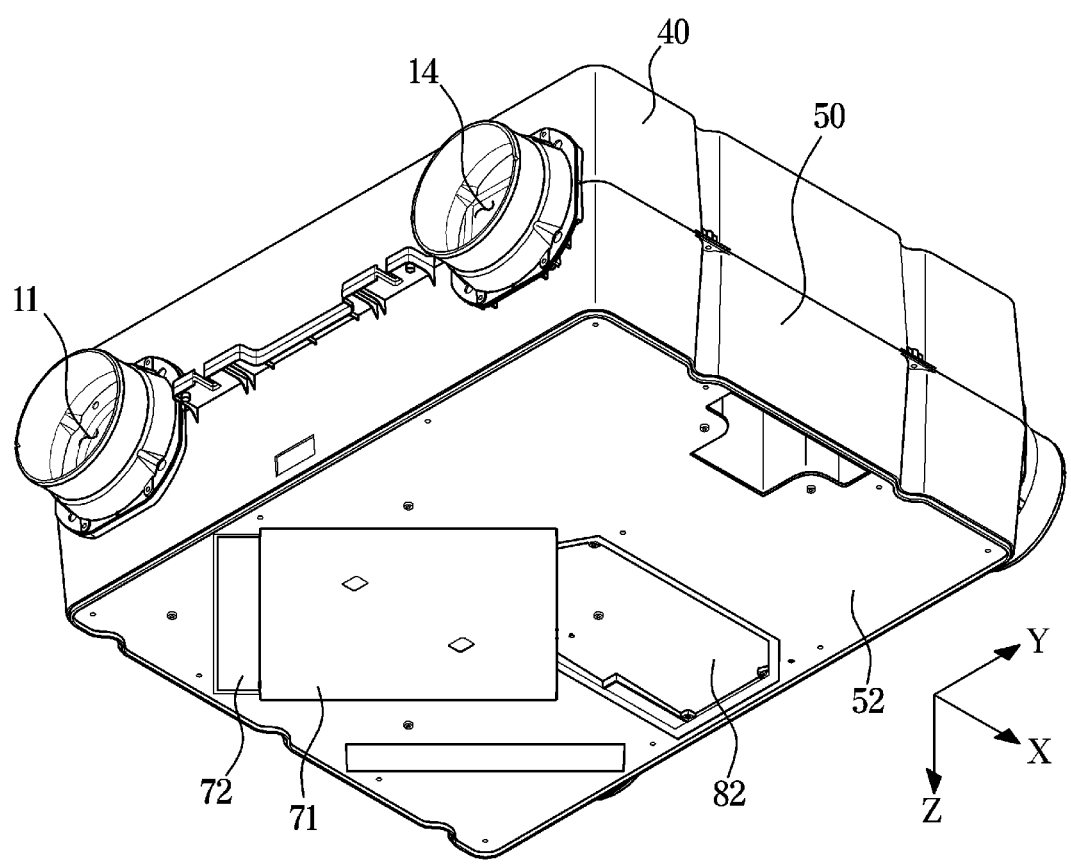
FIG. 5 is a view illustrating the first type-ventilation apparatus shown in FIG. 1, in a state in which some components of the ventilation apparatus are removed, from the bottom to the top.
Figure 6:
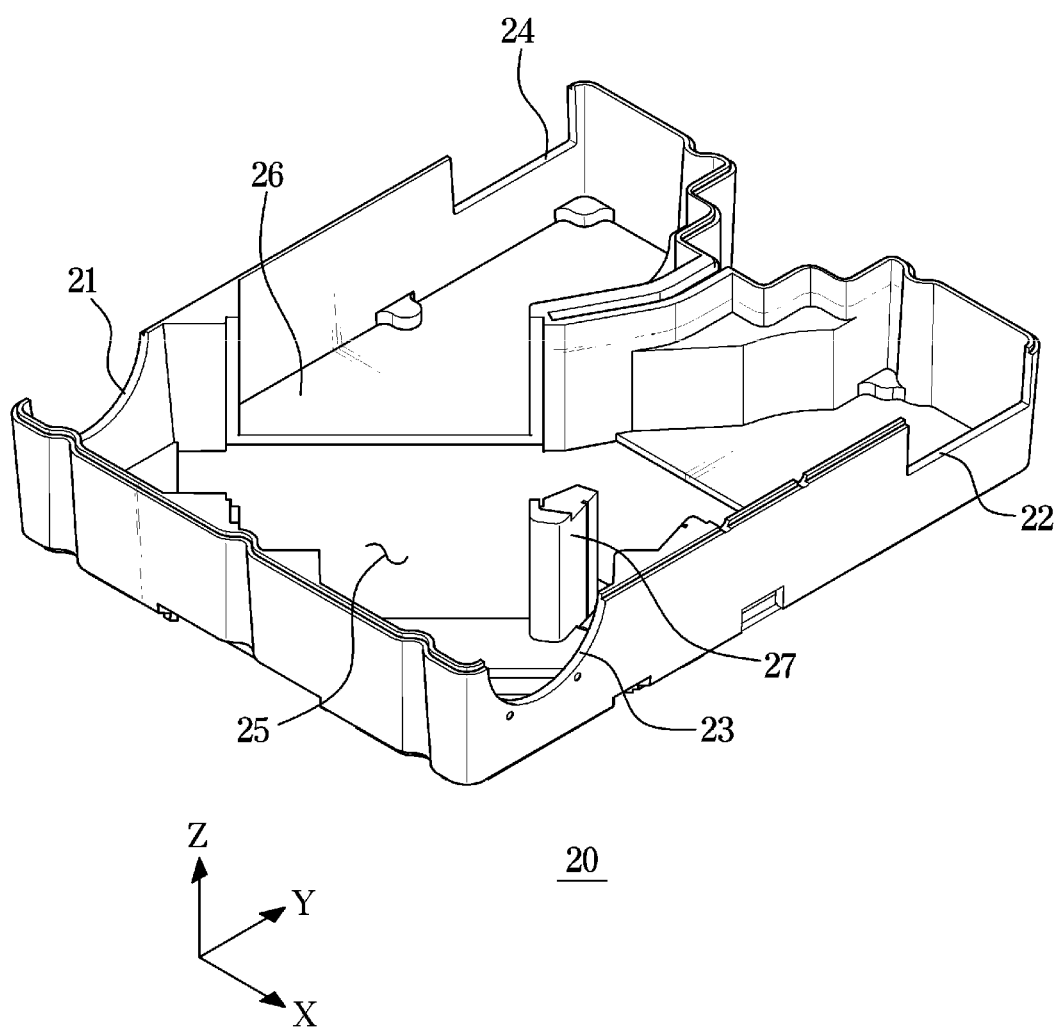
FIG. 6 is a perspective view illustrating a second housing of the first type-ventilation apparatus shown in FIG. 1.
Figure 7:
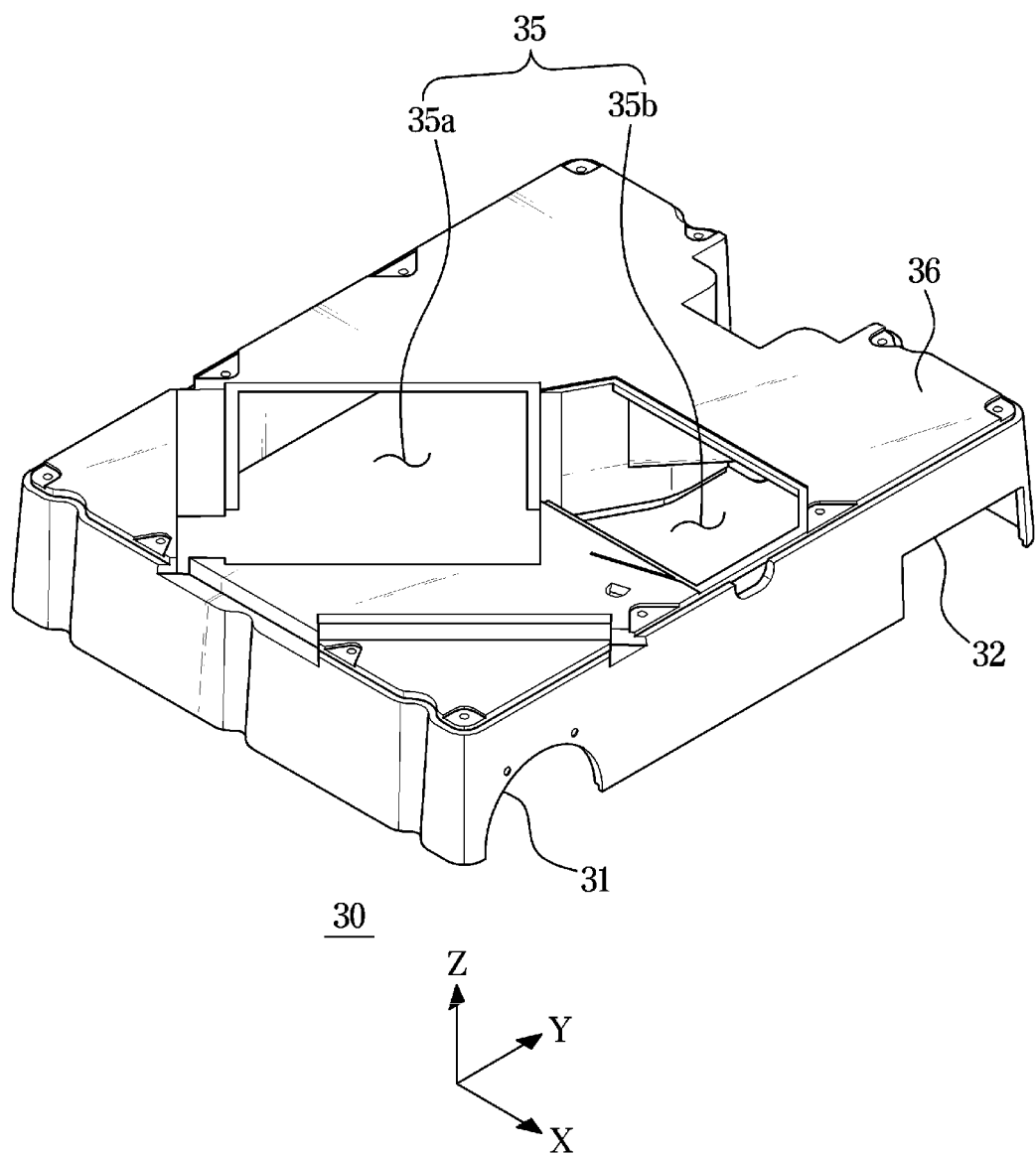
FIG. 7 is a perspective view illustrating a first housing of the first type-ventilation apparatus shown in FIG. 1.
Figure 8:
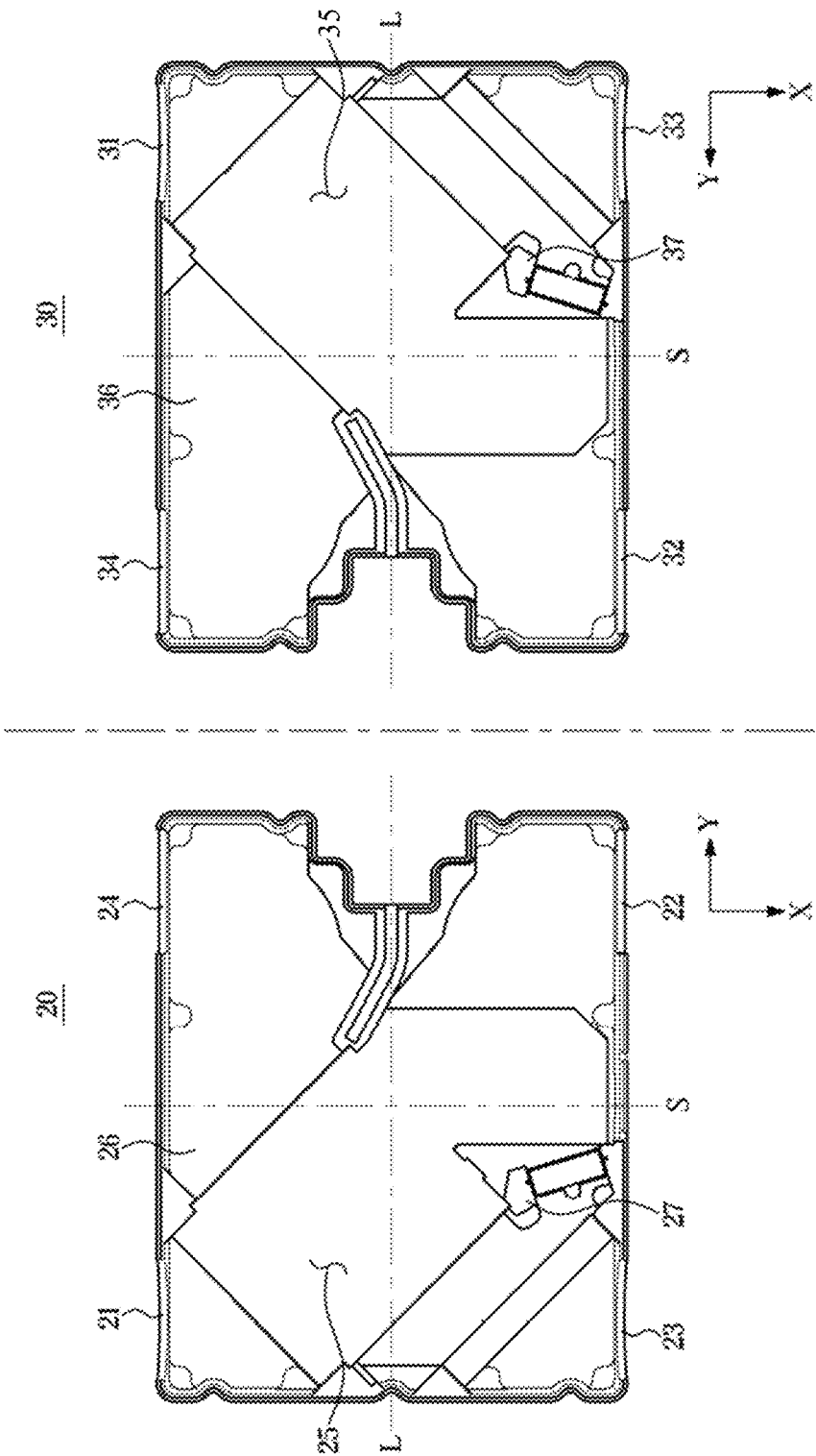
FIG. 8 is a view illustrating a state in which an upper housing and a lower housing of the first type-ventilation apparatus shown in FIG. 1 are arranged in the left and right direction.

FIG. 1 is a view illustrating a ventilation system according to an embodiment of the disclosure, FIG. 2 is a view illustrating a ventilation apparatus shown in FIG. 1, in a state in which some components of a first type-ventilation apparatus are removed, from the top to the bottom, FIG. 3 is a view schematically illustrating an air flow of the ventilation system according to an embodiment of the disclosure, FIG. 4 is an exploded perspective view illustrating the first type-ventilation apparatus shown in FIG. 1, FIG. 5 is a view illustrating the first type-ventilation apparatus shown in FIG. 1, in a state in which some components of the ventilation apparatus are removed, from the bottom to the top, FIG. 6 is a perspective view illustrating a second housing of the first type-ventilation apparatus shown in FIG. 1, FIG. 7 is a perspective view illustrating a first housing of the first type-ventilation apparatus shown in FIG. 1, and FIG. 8 is a view illustrating a state in which an upper housing and a lower housing of the first type-ventilation apparatus shown in FIG. 1 are arranged in the left and right direction.

Referring to FIGS. 1 to 8, a ventilation system may include a ventilation apparatus 1 provided to communicate with an indoor space I and an outdoor space O and configured to exchange indoor air with outdoor air, and an outdoor unit 2 configured to circulate a refrigerant supplied to the ventilation apparatus 1.

In the disclosure, all drawings schematically and exemplarily show the configuration of the outdoor unit 2 at a practicable level. The outdoor unit 2 corresponds to an outdoor unit for an air conditioner commonly known in the art, and thus a person skilled in the art can easily change or easily add various configurations necessary for the implementation of the outdoor unit 2. The outdoor unit 2 may be provided at a technical level that is understood by those skilled in the art based on the contents of the disclosure.

A conventional ventilation system does not include the outdoor unit 2, and the conventional ventilation system is configured to perform heat-exchange between air, which is introduced from the outdoor space O to the indoor space I, and air, which is discharged from the indoor space I to the outdoor space O, by using a total heat-exchanger 71 arranged in the ventilation apparatus 1, and configured to circulate air between the indoor space I and the outdoor space O by the ventilation apparatus 1.

However, the ventilation system according to an embodiment of the disclosure includes the outdoor unit 2 and the ventilation apparatus 1 includes a heat exchanger 81 connected to the outdoor unit 2. Accordingly, the ventilation system may be configured to exchange heat between air, which is introduced from the outdoor space O to the indoor space I, and air, which is discharged from the indoor space I to the outdoor space O, and additionally configured to dehumidify air supplied to the indoor space I. This will be described later in detail.

The ventilation apparatus 1 may include a housing 10 forming an exterior. The housing 10 may be provided in a substantially box shape. The housing 10 may include an inlet flow path 15 provided to suck outdoor air into the indoor space and an outlet flow path 16 provided to discharge indoor air to the outdoor space. The inlet flow path 15 and the outlet flow path 16 may be partitioned from each other by the housing 10.

The housing 10 may include a first inlet chamber 17a provided with a first inlet 11 provided to communicate with the outdoor space O to allow outdoor air A1 to flow into the housing 10 and provided with the inlet flow path 15 arranged therein, and a second inlet chamber 17b provided with a first outlet 12 provided to communicate with the indoor space I to allow the outdoor air A1, which is sucked into the housing 10, to be discharged into the indoor space I, and provided with the inlet flow path 15 arranged therein. The inlet flow path 15 may connect the first inlet 11 to the first outlet 12.

The housing 10 may include a first outlet chamber 18a provided with a second inlet 13 provided to communicate with the indoor space I to allow indoor air A2 to flow into the housing 10 and provided with the outlet flow path 16 arranged therein, and a second outlet chamber 18b provided with a second outlet 14 provided to communicate with the outdoor space O to allow the indoor air A2, which is sucked into the housing 10, to be discharged into the outdoor space, and provided with the outlet flow path 16 arranged therein. The outlet flow path 16 may connect the second inlet 13 to the second outlet 14.

The ventilation apparatus 1 may include a first blower 61 arranged inside the second inlet chamber 17b and configured to generate a blowing force for sucking the outdoor air A1 into the indoor space, and provided to communicate with the first outlet 12. The ventilation apparatus 1 may include a second blower 62 arranged inside the second outlet chamber 18b and configured to generate a blowing force for discharging the indoor air A2 into the outdoor space, and provided to communicate with the second outlet 14.

The ventilation apparatus 1 may include the total enthalpy heat exchanger 71 in which the air flowing through the outlet flow path 16 and the air flowing through the inlet flow path 15 exchange heat with each other. The total enthalpy heat exchanger 71 may correspond to a plate total enthalpy heat exchanger or a rotary total enthalpy heat exchanger. The total enthalpy heat exchanger 71 may be arranged on a point where the inlet flow path 15 and the outlet flow path 16 intersect. That is, it can be said that the total enthalpy heat exchanger 71 is arranged on the inlet flow path 15 and at the same time arranged on the outlet flow path 16.

The total enthalpy heat exchanger 71 may allow the first inlet chamber 17a to communicate with the second inlet chamber 17b. The total enthalpy heat exchanger 71 may allow the first outlet chamber 18a to communicate with the second outlet chamber 18b.

The ventilation apparatus 1 may include a filter 72 provided to remove foreign substances flowing on the outdoor air A1.

The filter 72 may be provided to collect foreign substances of a predetermined size. The filter 72 may be a High Efficiency Particulate Air (HEPA) filter provided to collect fine dust of a predetermined size. The HEPA filter may be formed of glass fibers. However, the disclosure is not limited thereto, and the filter 72 may be provided with various types of filters provided to collect foreign substances.

In addition, the filter 72 is not limited thereto and may be provided as a photocatalytic filter that induces chemical action of air using a photocatalyst. That is, the filter 72 may include a photocatalyst and induce a chemical reaction by the light energy of the photocatalyst, thereby sterilizing various pathogens and bacteria present in the air. Acceleration of chemical action may cause decomposition, removal or capture of odor particles in the air.

In addition, although not shown in the drawings, a pre-filter for collecting foreign substances of a predetermined size or larger in the air may be additionally provided.

The filter 72 may be arranged adjacent to the total enthalpy heat exchanger 71. Particularly, the total enthalpy heat exchanger 71 may include an intake end 71a through which the outdoor air A1 on the inlet flow path 15 flows, and the filter 72 may be arranged to face the intake end 71a of the total enthalpy heat exchanger 71.

It is appropriate that the filter 72 is arranged to closely face the intake end 71a. Accordingly, foreign substances flowing in the outdoor air A1 introduced through the first inlet 11 are collected by the filter 72 before the outdoor air A1 flows into the total enthalpy heat exchanger 71, and it is possible to prevent contamination of the total enthalpy heat exchanger 71.

The ventilation apparatus 1 may include a dehumidifying unit 80 configured to adjust a humidity of the air flowing through the inlet flow path 15.

The dehumidifying unit 80 may control the humidity of the outdoor air A1 flowing through the inlet flow path 15, and may additionally control the temperature.

The dehumidifying unit 80 may include a heat exchanger 81 provided to exchange heat with the outdoor air A1 flowing in the inlet flow path 15 and a drain tray 82 provided to collect condensed water generated by the heat exchanger 81.

The heat exchanger 81 may be provided as a pair of heat exchangers. The pair of heat exchangers 81 may exchange heat with the outdoor air A1, respectively. The pair of heat exchangers 81 may be driven in a mode in which all of the heat exchangers operate as evaporators, or in a mode in which one heat exchanger operates as an evaporator and the other heat exchanger operates as a condenser.

As described above, the heat exchanger 81 may be driven in various modes to selectively dehumidify the outdoor air A1 while maintaining the temperature of the outdoor air A1 or while cooling the outdoor air A1.

However, the disclosure is not limited thereto, and the heat exchanger 81 may be provided as a single heat exchanger to mainly dehumidify the outdoor air A1.

The dehumidifying unit 80 may be arranged on the inlet flow path 15. The dehumidifying unit 80 may be arranged inside the second inlet chamber 17b. That is, the dehumidifying unit 80 may be arranged on a downstream side of the inlet flow path 15 than the total enthalpy heat exchanger 71.

The housing 10 may include a first housing 30 and a second housing 20 provided to be coupled to the first housing 30 in the up and down direction Z.

The ventilation apparatus 1 may include covers 40 and 50 provided to cover the housing 10. The covers 40 and 50 may be provided to form the exterior of the ventilation apparatus 1.

The covers 40 and 50 may include a first cover 50 arranged on the lower side in the up and down direction Z, and a second cover 40 arranged above the first cover 50 in the up and down direction Z and coupled to the first cover 50 in the up and down direction Z.

The housing 10 may be formed of an insulating material. It is appropriate that the housing 10 is formed of an EPS insulating material such as Styrofoam. However, the disclosure is not limited thereto, and the housing 10 may be formed of various insulating materials provided to maintain the temperature of the air flowing through the inlet flow path 15 and the outlet flow path 16 at a predetermined temperature.

The covers 40 and 50 may be provided to cover the housing 10 formed of an insulating material to protect the housing 10 from the outside. The covers 40 and 50 may be formed of an injection product such as plastic.

According to an embodiment of the disclosure, the components are named as the housing 10 and the covers 40 and 50, but the housing 10 may be named as the insulator 10 and the covers 40 and 50 may be named as the housings 40 and 50. However, hereinafter the housing 10 and the covers 40 and 50 will be described with the above-described component names.

The ventilation apparatus 1 of the ventilation system may be arranged in the indoor space I to ventilate the indoor space I by introducing the outside air A1 into the indoor space I and discharging the indoor air A2 to the outside space O. The ventilation apparatus 1 may circulate the indoor air A2.

When the ventilation apparatus 1 is installed in the indoor space I such as multi-plex housing or apartment, the indoor space I may be provided as a pair of indoor spaces I1 and I2 provided symmetrically, as shown in FIG. 1.

The pair of indoor spaces I1 and I2 may be formed mirror-symmetrically in the left and right direction Y based on the direction in which the outdoor air A1 is discharged into the indoor space I.

Accordingly, air conditioning equipment formed on each of the indoor spaces I1 and I2 may also be provided to be formed symmetrically in the left and right direction Y.

That is, the ventilation apparatus 1 may be arranged in the indoor space I, and pipes P1 and P2 formed in the indoor space I may be provided to be connected to the first outlet 12 and the second inlet 13 of the ventilation apparatus 1. Each pipe P1 and P2 may extend to each region Ia, Ib, Ic, and Id of the indoor space I so as to allow each region Ia, Ib, Ic, and Id to be ventilated.

A structure of the pipes P1 and P2 arranged in the indoor spaces I1 and I2 may also be provided to be formed symmetrically in the left and right direction Y.

When the ventilation apparatus 1 in the same shape is arranged in each of the indoor spaces I1 and I2, the first and second inlets 11 and 13 and the first and second outlets 12 and 14 may be arranged to be opposite to each other in the left and right direction Y, and thus it may be difficult to install the ventilation apparatus 1 to the indoor spaces I1 and I2.

Accordingly, as for the conventional ventilation apparatus, upper and lower surfaces of the housing are turned over in the left and right direction Y and installed in the pair of indoor spaces I1 and I2, respectively.

However, the ventilation apparatus 1 according to an embodiment of the disclosure may include the dehumidifying unit 80 for dehumidifying the indoor space I as well as for simple ventilating the indoor space I as described above. A user needs to periodically draw out the drain tray 82, which is provided to collect the condensed water generated by the dehumidifying unit 80, from the ventilation apparatus 1 and clean the drain tray 82.

In addition, the user needs to draw out the total enthalpy heat exchanger 71 and the filter 72 from the ventilation apparatus 1 to periodically remove the foreign substances collected in the total enthalpy heat exchanger 71 and the filter 72.

As for the ventilation apparatus 1, a draw-out hole provided to allow the drain tray 82, the total enthalpy heat exchanger 71, and the filter 72 to be drawn out may be provided in the housing 10 and the covers 40 and 50, respectively. Accordingly, the drain tray 82, the total enthalpy heat exchanger 71, and the filter 72 may be drawn out through the draw-out hole.

When the ventilation apparatus 1 is simply installed with the upper and lower surfaces of the housing turned over in the left and right direction Y, it may be difficult to draw out the drain tray 82, the total enthalpy heat exchanger 71, and the filter 72.

That is, when the ventilation apparatus 1 is turned over in the left and right direction Y, a position of the drain tray 82, the total enthalpy heat exchanger 71, and the filter 72 may be inverted in the up and down direction Z, and thus the position thereof may not correspond to a position of the draw-out hole formed in the ventilation apparatus 1 with respect to the up and down direction Z. Accordingly, the drain tray 82, the total enthalpy heat exchanger 71, and the filter 72 may not be drawn out.

In order to prevent this difficulty, a pair of ventilation apparatus 1 are manufactured in a type corresponding to each of the indoor spaces I1 and I2 or the air conditioning equipment of each of the indoor spaces I1 and I2 is formed differently, which may cause an increase in a manufacturing cost, and a difficulty in that the ventilation apparatus 1 is inefficiently installed in the indoor space I.

The conventional ventilation apparatus does not include the dehumidifying unit 80, and thus the conventional ventilation apparatus is turned in the left and right direction Y and installed regardless of the withdrawal of the drain tray 82.

In addition, the conventional ventilation apparatus may be provided such that the total enthalpy heat exchanger 71 and the filter 72 are drawn out from the ventilation apparatus 1. In the conventional ventilation apparatus, the total enthalpy heat exchanger 71 and the filter 72 are arranged to be symmetrical in the left and right direction Y or the front and rear direction X with respect to one of a long central axis L extending parallel to a long side of the housing 10 and a short central axis S extending parallel to a short side of the housing 10.

However, unlike an embodiment of the disclosure, the short side of the housing 10 may extend in the left and right direction Y and the long side may extend in the front and rear direction X, and accordingly, a direction in which the long central axis L and the short central axis S extend may be different.

In addition, in order to draw out the total enthalpy heat exchanger 71 and the filter 72 from the ventilation apparatus in both direction in the up and down direction Z, a draw-out hole is formed in the housing 10 and the covers 40 and 50 to correspond to an upper end and a lower end in the up and down direction Z.

Accordingly, even when the ventilation apparatus 1 is turned over in the left and right direction Y and installed, the total enthalpy heat exchanger 71 and the filter 72 may be withdrawn from the ventilation apparatus 1 in any direction in the up and down direction Z through the draw-out hole formed at the upper end or the draw-out hole formed at the lower end.

However, as for the ventilation apparatus 1 according to an embodiment of the disclosure, the dehumidifying unit 80 may be arranged inside the housing 10 and thus it is difficult to arrange the dehumidifying unit 80 as well as the total enthalpy heat exchanger 71 and the filter 72 to be symmetrical with respect to one of the central axes L and S.

That is, it is required to arrange the dehumidifying unit 80, the total enthalpy heat exchanger 71 and the filter 72 to the housing 10. Accordingly, when arranging each of components to the left and right direction Y or the front and rear direction X with respect to one of the central axes L and S, the size of the ventilation apparatus 1 may be increased in comparison with the conventional ventilation apparatus, which may cause a difficulty in that it is difficult to install the ventilation apparatus to the indoor space I and a difficulty in that the efficiency is reduced due to an increase in an area of the inlet flow path 15 and the outlet flow path 16 formed therein.

In order to prevent this difficulty, as for the ventilation apparatus 1 according to the disclosure, the first housing 30 may form one surface 36 of the housing 10, and include a first hole 35 formed on the one surface 36 to be asymmetrical with respect to a central line L of the one surface 36 extending in a long side direction of the one surface 36 or a central line S of the one surface 36 extending in a short side direction of the one surface 36, and provided to allow the drain tray 82, the total enthalpy heat exchanger 71 and the filter 72 to be drawn out from the outside of the housing 10.

In addition, the second housing 20 may form the other surface 26 of the housing, and include a second hole 25 arranged on the other surface 26 and formed in a shape corresponding to the first hole 35 in the up and down direction Z.

One of the first housing 30 and the second housing 20 may be selectively covered by the first cover 50, and the other one of the first housing 30 and the second housing 20 may be covered by the second cover 40.

That is, the first cover 50 and the second cover 40 may be respectively arranged to fixedly form a lower and an upper portion of the ventilation apparatus 1, and one of the first housing 30 and the second housing 40 may be provided to be selectively inserted into the first cover 30 forming the lower portion of the ventilation apparatus 1 and the other of the first housing 30 and the second housing 40 may be provided to be selectively inserted into the second cover 40.

Accordingly, the first housing 30 may be inserted into the first cover 50 and arranged in the lower portion of the ventilation apparatus 1, and alternatively, the second housing 20 may be inserted into the first cover 50 and arranged in the lower portion of the ventilation apparatus 1.

When it is assumed that a ventilation apparatus 1 arranged on the left side with respect to the left and right direction Y with reference to FIG. 1 is defined as the first type 1A and a ventilation apparatus 1 arranged on the right side with respect to the left and right direction Y is defined as the second type 1B, the ventilation apparatus 1 according to an embodiment of the disclosure may implement the first type-ventilation apparatus 1A and the second type-ventilation apparatus 1B by changing the position of the first housing 30 and the second housing 20 with respect to the up and down direction Z.

In the first type-ventilation apparatus 1A, the first housing 30 may form a lower portion of the housing 10 in the up and down direction Z and be inserted into the first cover 50. Accordingly, the second housing 20 may be provided to be arranged above the first housing 30 with respect to the up and down direction Z.

The internal components of the housing 10 such as the blowers 61 and 62, the dehumidifying unit 80, the total enthalpy heat exchanger 71, and the filter 72 may be mounted based on the internal shape of the first housing 30. As will be described later, the drain tray 82, the total enthalpy heat exchanger 71, and the filter 72 may be arranged to correspond to the first hole 35 of the first housing 30.

In the second type-ventilation apparatus 1B, the second housing 20 may form a lower portion of the housing 10 in the up and down direction Z and be inserted into the first cover 50. Accordingly, the first housing 30 may be provided to be arranged above the second housing 20 with respect to the up and down direction Z.

The internal components of the housing 10 such as the blowers 61 and 62, the dehumidifying unit 80, the total enthalpy heat exchanger 71, and the filter 72 may be mounted based on the internal shape of the second housing 20. As will be described later, the drain tray 82, the total enthalpy heat exchanger 71, and the filter 72 may be arranged to correspond to the second hole 25 of the second housing 20.

That is, by simply changing only the positions of the first and second housings 30 and 20 in the up and down direction Z, the first and second type-ventilation apparatuses 1A and 1B may be formed. Hereinafter it will be described with reference to the first type-ventilation apparatus 1A.

As shown in FIG. 4, the ventilation apparatus 1 may be provided in such a way that the second cover 40 forming the upper portion of the ventilation apparatus 1, the second housing 20 provided to be inserted into the second cover 40, the first housing 30 coupled to the second housing 20 from the lower side with respect to the up and down direction Z, and the first cover 50 forming the lower portion of the ventilation apparatus 1 and provided to cover the first housing 30 are sequentially arranged.

The internal components of the housing 10 such as the blowers 61 and 62, the dehumidifying unit 80, the total enthalpy heat exchanger 71, and the filter 72 may be arranged to be supported by the first housing 30 or the second housing 20. However, the drain tray 82, the total enthalpy heat exchanger 71, and the filter 72 may be supported so as to be withdrawn downward of the ventilation apparatus 1 through the first hole 35 of the first housing 30.

As described above, the first and second housings 30 and 20 may be assembled by changing the position thereof with respect to the up and down direction Z, but the first and second covers 50 and 40 may be arranged at the same position regardless of the type of the ventilation apparatus 1. The second cover 40 may always form the upper portion of the ventilation apparatus 1, and the first cover 50 may always form the lower portion of the ventilation apparatus 1.

The first cover 50 may include a body 51 in a rectangular frame shape, a surface member 52 detachably coupled to the body 51 and formed in a plate shape, and a lower cover 53 formed in a lower portion so as to cover the surface member 52.

Unlike the second cover 40, the first cover 50 may be provided to communicate with the housing 10 to allow the drain tray 82, the total enthalpy heat exchanger 71, and the filter 72 to be drawn out of the ventilation apparatus 1.

Particularly, the surface member 52 may include a third hole 52*d* provided to correspond to the first hole 35 of the first housing 30.

The surface member 52 may include a plate body 52*a*, a first surface 52*b* of the plate body 52*a*, and a second surface 52*c* arranged on an opposite side of the first surface 52*b*.

The third hole 52*d* may be formed on the plate body 52*a*. As described above, the third hole 52*d* may be provided to correspond to the first hole 35 and thus the third hole 52*d* may be provided to be asymmetrical on the plate body 52*a* with respect to one of the long central axis L and the short central axis S of the housing 10.

In the first type-ventilation apparatus 1A, the surface member 52 may be coupled to the body 51 to allow the first surface 52*b* to face downward. In response to the first surface 52*b* being coupled to the body 51 to allow the first surface 52*b* to face downward, the third hole 52*d* may be provided to correspond to the first hole 35 of the first housing 30 in the up and down direction Z.

The first hole 35 and the third hole 52*d* may include substantially the same shape and may be overlapped in the up and down direction Z.

The surface member 52 may be coupled to the body 51 to allow the second surface 52*c* to face downward. Because the surface member 52 is turned over, the third hole 52*d* may be arranged in a shape that is inverted in comparison with the shape in which the surface member 52 is coupled to the body 51 to allow the first surface 52*b* to face downward. This will be described later in detail.

As shown in FIG. 5, in response to removing the lower cover 53 from the first cover 50, the drain tray 82, the total enthalpy heat exchanger 71, and the filter 72 may be exposed to the outside through the lower side of the ventilation apparatus 1.

The user can draw out the drain tray 82, the total enthalpy heat exchanger 71 and the filter 72 downward from the ventilation apparatus 1 as needed.

The first housing 30 and the second housing 20 may include the identical outer structure, as shown in FIGS. 6 to 8. As described above, the first housing 30 or the second housing 20 is provided to be selectively inserted into the first cover 50, and thus, in order that the housings 20 and 30 is inserted into and supported by the first cover 50, the housings 20 and 30 may include the identical outer shape.

Conversely, the first housing 30 or the second housing 20 is provided to be selectively inserted into the second cover 40, and thus, in order that the housings 20 and 30 are inserted into and supported by the second cover 40, the housings 20 and 30 may include the identical outer shape.

The first housing 30 may include a first inlet forming portion 31 forming a portion of the first inlet 11, a first outlet forming portion 32 forming a portion of the first outlet 12, a second inlet forming portion 33 forming a portion of the second inlet 13, and a second outlet forming portion 34 forming a portion of the second outlet 14.

The first outlet forming portion 32 and the second outlet forming portion 34 may be provided to be symmetrical with respect to the long central axis L. In addition, the first inlet forming portion 31 and the second inlet forming portion 33 may be provided to be symmetrical with respect to the long central axis L.

This is to allow the first housing 30 to maintain the same shape despite of the reverse in the left and right direction Y.

For example, in the first type-ventilation apparatus 1A, the first outlet forming portion 32 may be arranged on the right side of the ventilation apparatus 1 in the left and right direction Y, but in the second type-ventilation apparatus 1B, the first outlet forming portion 32 may be arranged on the left side of the ventilation apparatus 1 in the left and right direction Y.

In the same manner as the first housing 30, the second housing 20 may include a first inlet forming portion 21 forming a portion of the first inlet 11, a first outlet forming portion 22 forming a portion of the first outlet 12, a second inlet forming portion 23 forming a portion of the second inlet 13, and a second outlet forming portion 24 forming a portion of the second outlet 14.

The first outlet forming portion 22 and the second outlet forming portion 24 may be provided to be symmetrical with respect to the long central axis L. In addition, the first inlet forming portion 21 and the second inlet forming portion 23 may be provided to be symmetrical with respect to the long central axis L.

The first outlet forming portion 32 of the first housing 30 and the first outlet forming portion 22 of the second housing 20 may be provided to correspond to each other in the up and down direction Z. The first inlet forming portion 31 of the first housing 30 and the first inlet forming portion 21 of the second housing 20 may be provided to correspond to each other in the up and down direction Z. The second outlet forming portion 34 of the first housing 30 and the second outlet forming portion 24 of the second housing 20 may be provided to correspond to each other in the up and down direction Z. The second inlet forming portion 33 of the first housing 30 and the second inlet forming portion 23 of the second housing 20 may be provided to correspond to each other in the up and down direction Z.

This is to allow first and second outlets 12 and 14 and the first and second inlets 11 and 13 to have the same shape even when the first housing 30 and the second housing 20 are inverted in the up and down direction and assembled.

The first housing 30 and the second housing 20 each may include a partition provided to define the first and second inlet chambers 17*a* and 17*b* and the first and second outlet chambers 18*a* and 18*b* in the housing 10.

Each partition may be provided in accordance with the up and down direction Z.

As described above, the dehumidifying unit 80 may be arranged in the second inlet chamber 17*b*. Accordingly, the second inlet chamber 17*b* may be provided to have a larger area than the first inlet chamber 17*a* and the first and second outlet chambers 18*a* and 18*b*.

The first and second inlet chambers 17*a* and 17*b* and the first and second outlet chambers 18*a* and 18*b* may be formed as a space formed by the one surface 36 of the housing 10 formed on the first housing 30 and the other surface 26 of the housing 10 formed on the second housing 20, and the partition of the first and second housings 20 and 30. The first and second inlet chambers 17*a* and 17*b* and the first and second outlet chambers 18*a* and 18*b* may communicate with each other by the total enthalpy heat exchanger 71.

The total enthalpy heat exchanger 71 may be provided in a square shape. This is to provide the same amount of heat exchange between the outdoor air A1 and the indoor air A2 flowing in the total enthalpy heat exchanger 71.

The first hole 35 through which the heat exchanger 71, the filter 72, and the drain tray 82 are drawn out may be divided into a first region 35*a* through which the heat exchanger 71 and the filter 72 are drawn out, and a second region 35*b* through which the drain tray 82 is drawn out.

According to an embodiment of the disclosure, the first region 35*a* and the second region 35*b* may be provided in a shape connected to each other, but the disclosure is not limited thereto. Alternatively, the first region 35*a* and the second region 35*b* may be separated from each other.

The first region 35*a* may have a substantially rectangular shape. This is because, as described above, the total enthalpy heat exchanger 71 is provided to have a square cross section, and the filter 72 is arranged adjacent to the intake end 71*a* of the total enthalpy heat exchanger 71.

Therefore, in order to expose both the total enthalpy heat exchanger 71 and the filter 72 to the outside, the first region 35*a* may be provided in a rectangular shape.

The second region 35*b* may be provided in a shape corresponding to a cross-section of the drain tray 82. A shape of the cross-section of the second region 35*b* is not limited to one shape and may be formed in various shapes.

When it is assumed that, with respect to the front and rear direction X, a side on which the first inlet 11 and the second outlet 14 are arranged is defined as one side, and a side on which the second inlet 13 and the first outlet 12 are arranged is defined as the other side, the total enthalpy heat exchanger 71 may be arranged adjacent to the one side of the housing 10 with respect to the long central axis L. Particularly, the total enthalpy heat exchanger 71 may be arranged closest to the first inlet 11.

This is to maximize the area of the second inlet chamber 17b in the limited internal space of the housing 10 because it is required to arrange the dehumidifying unit 80 to be adjacent to the first outlet 12.

Accordingly, in the first housing 30, the first region 35a of the first hole 35 may be arranged most adjacent to the first outlet forming portion 32 of the first housing 30 with respect to the long central axis L, so as to correspond to the total enthalpy heat exchanger 71.

Accordingly, the first hole 35 may be formed asymmetrically at the center with respect to the long central axis L or the short central axis S on the one surface 36 of the first housing 30.

When the one surface 36 of the first housing 30 and the other surface 26 of the second housing 20 are arranged parallel to the long central axis L or the short central axis S on the same surface, the first hole 35 of the first housing 30 and the second hole 25 of the second housing 20 may be provided mirror-symmetrically with respect to a center line between the first housing 30 and the second housing 20.

Further, the partition of the first housing 30 and the partition of the second housing 20 may also be provided mirror-symmetrically with respect to the center line between the first housing 30 and the second housing 20.

Accordingly, even when the ventilation apparatus 1 is formed such that the first housing 30 and the second housing 20 are inverted in the up and down direction Z, the first type-ventilation apparatus 1A and the second type-ventilation apparatus 1B may be arranged symmetrically in the left and right direction Y.

Hereinafter the second type-ventilation apparatus 1B will be described.

Figure 9:
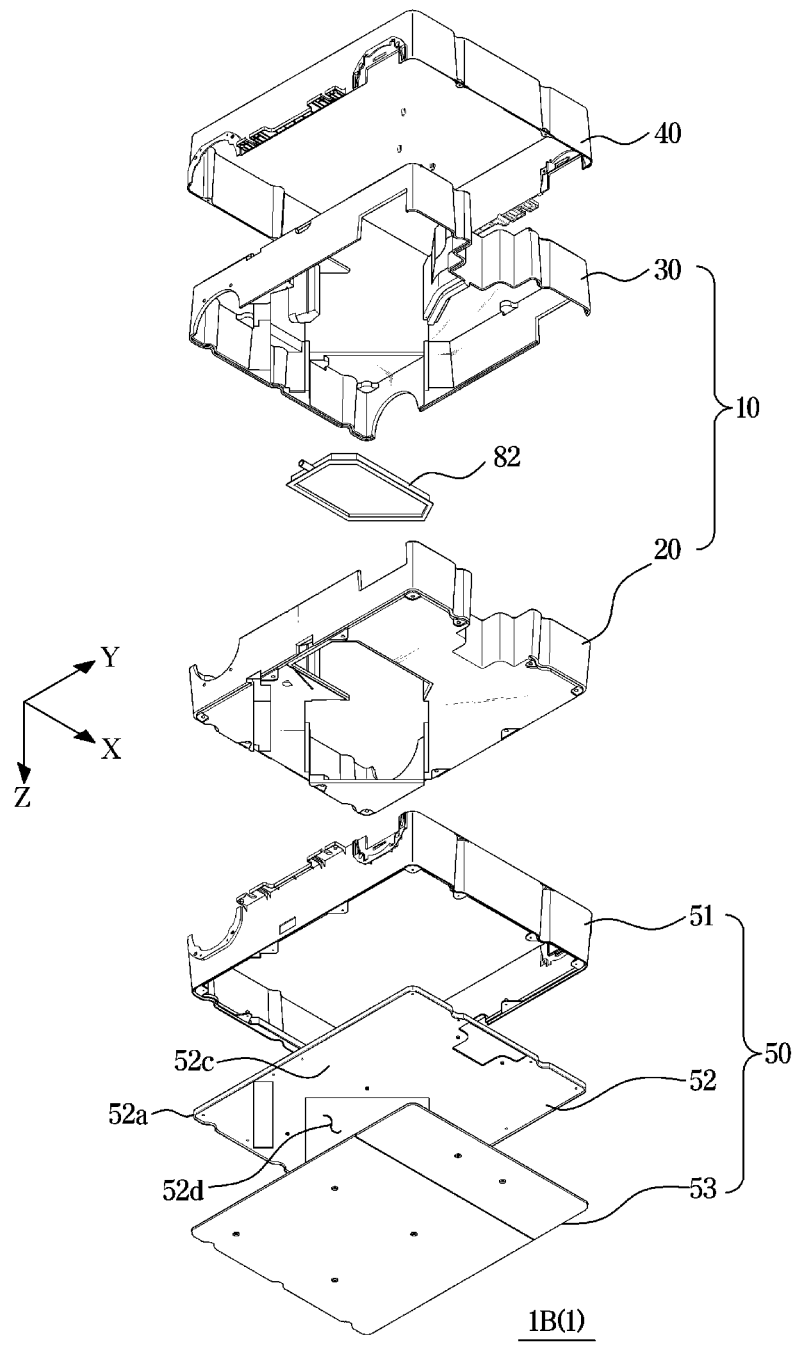
FIG. 9 is an exploded perspective view illustrating a second type-ventilation apparatus shown in FIG. 1.
Figure 10:
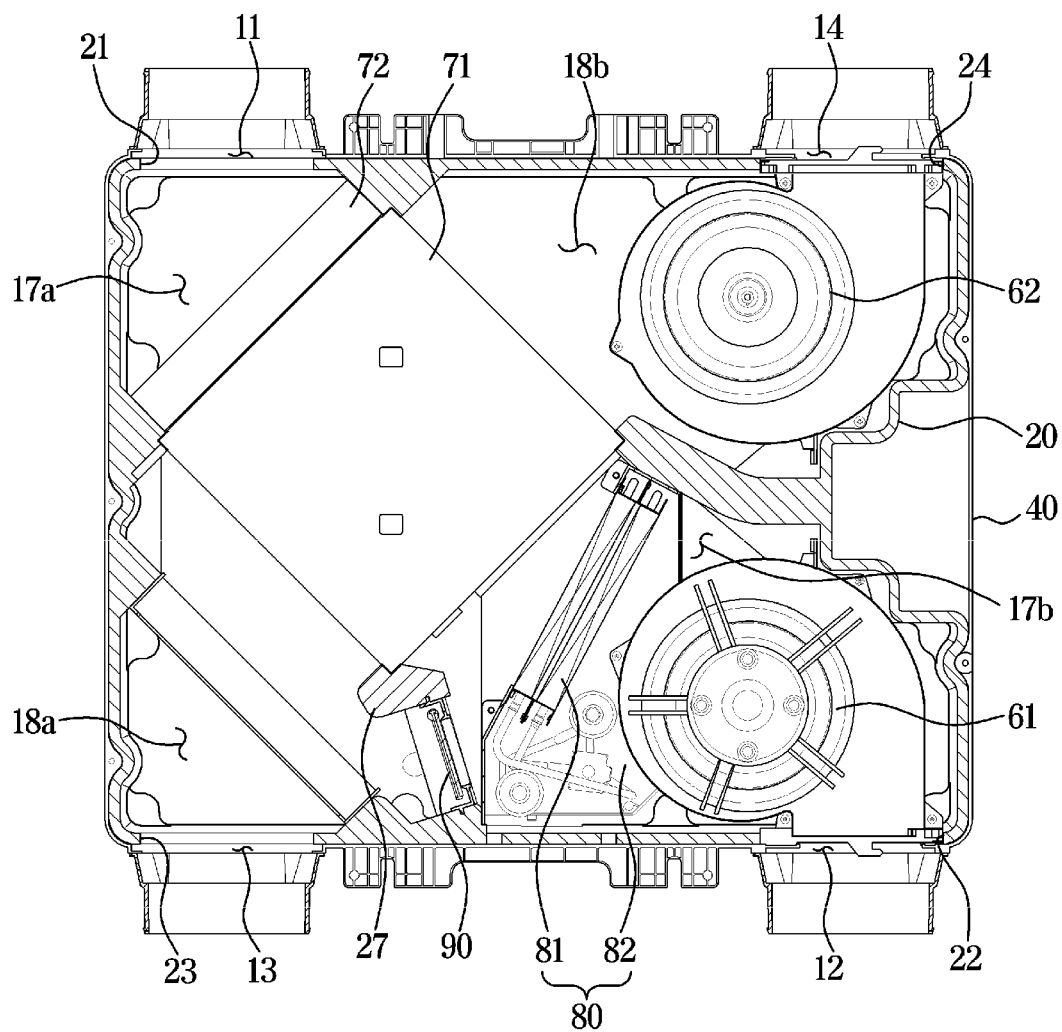
FIG. 10 is a view illustrating the ventilation apparatus shown in FIG. 1, in a state in which some components of the second type-ventilation apparatus are removed, from the top to the bottom.

FIG. 9 is an exploded perspective view illustrating a second type-ventilation apparatus shown in FIG. 1, and FIG. 10 is a view illustrating the ventilation apparatus shown in FIG. 1, in a state in which some components of the second type-ventilation apparatus are removed, from the top to the bottom.

In the second type-ventilation apparatus 1B, the first housing 30 may be arranged on the upper side and the second housing 20 may be arranged on the lower side in the up and down direction Z, as illustrated in FIGS. 9 and 10.

The first housing 30 may be provided to be inserted into the second cover 40, and the second housing 20 may be provided to be inserted into the first cover 50.

The internal components of the housing 10 such as the dehumidifying unit 80, the total enthalpy heat exchanger 71, and the filter 72 may be arranged inside the housing 10 that is inverted with respect to the up and down direction Z in comparison with the first type-ventilation apparatus 1A.

That is, the blowers 61 and 62, the total enthalpy heat exchanger 71, and the filter 72 accommodated inside the second type-ventilation apparatus 1B based on the front and rear direction X of the first type-ventilation apparatus 1A may be mounted to the housing 10 to be switched with respect to the front and rear direction X.

However, when the second type-ventilation apparatus 1B is installed in the indoor space I2, the first outlet 12 may be directed forward with respect to the front and rear direction X of the first type-ventilation apparatus 1A, and thus the first and second type-ventilation apparatuses 1A and 1B may be installed in the indoor space I so as to be symmetrical only in the left and right direction Y, respectively.

The drain tray 82, the total enthalpy heat exchanger 71, and the filter 72 may be provided to be drawn out of the ventilation apparatus 1 through the second hole 25 of the second housing 20.

The third hole 52d of the surface member 52 of the second cover 50 may be coupled to the body 51 to correspond to the second hole 25.

In the second type-ventilation apparatus 1B, the surface member 52 may be coupled to the body 51 to allow the second surface 52c to face downward. In response to being coupled to the body 51 to allow the second surface 52c to face downward, the third hole 52d may be provided to correspond to the second hole 25 of the second housing 20 in the up and down direction Z.

The second hole 25 and the third hole 52d may have substantially the same shape and may be overlapped in the up and down direction Z.

That is, when the first and second housings 30 and 20 are inverted in the up and down direction Z, the first surface 52b and the second surface 52c may be inverted in the same manner and then coupled to the body 51.

Accordingly, even when the first and second housings 30 and 20 are inverted to form any one of the first and second type-ventilation apparatuses 1A and 1B, the first cover 50 may arrange the third hole 52d to a position overlapped with the first and second holes 35 and 25 with respect to the up and down direction Z.

Hereinafter an operation of the ventilation apparatus 1 according to an embodiment of the disclosure will be described.

Figure 11:
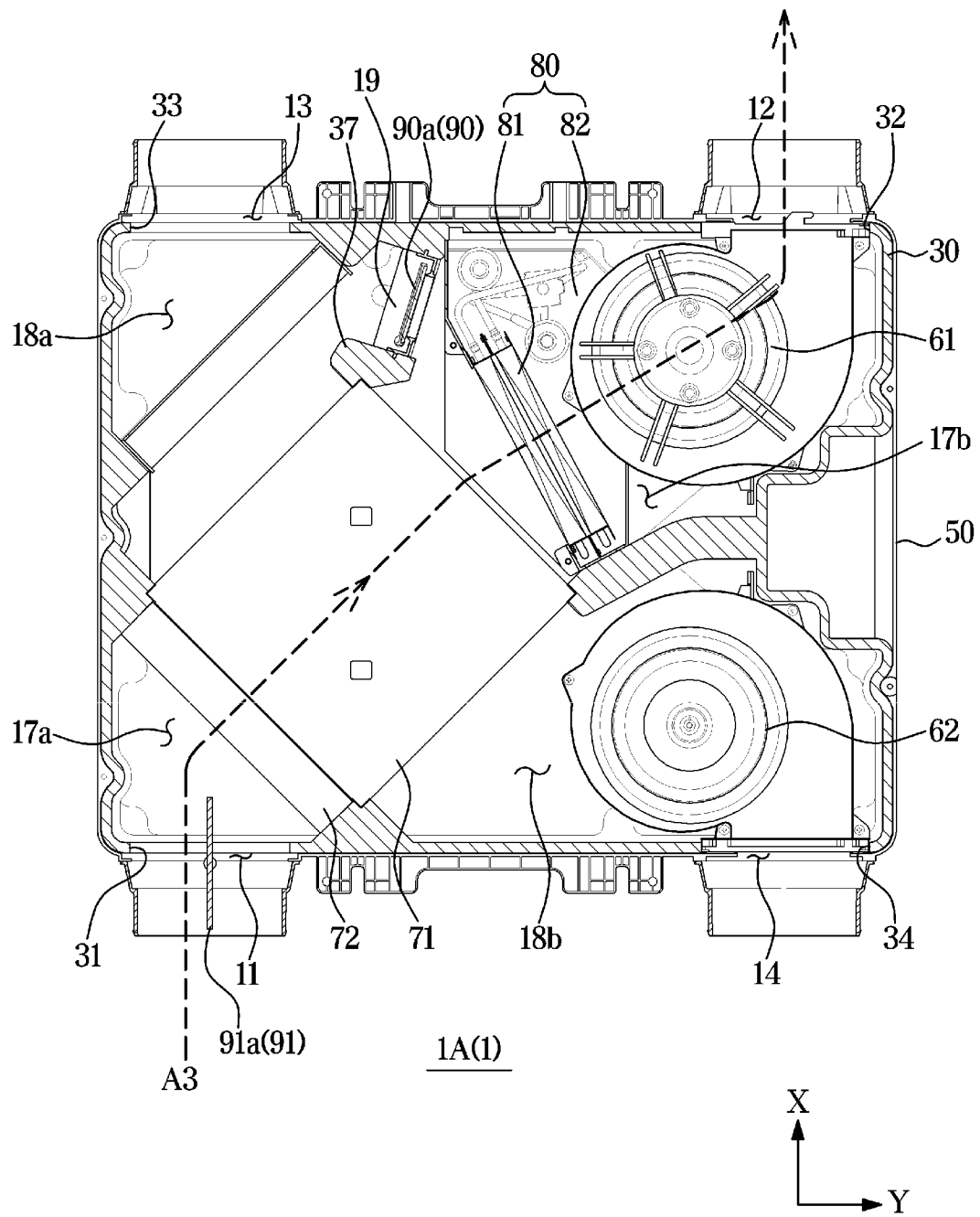
FIG. 11 is a view schematically illustrating an air flow of the first type-ventilation apparatus shown in FIG. 1.

FIG. 11 is a view schematically illustrating an air flow of the first type-ventilation apparatus shown in FIG. 1, and FIG. 12 is a view schematically illustrating an air flow in a mode different from the air flow, shown in FIG. 11, of the first type-ventilation apparatus shown in FIG. 1.

As illustrated in FIGS. 11 and 12, the housing 10 may include a connection flow path 19 connecting at least a portion of the inlet flow path 15 to the outlet flow path 16.

Particularly, the connection flow path 19 may be arranged between the first outlet chamber 18a and the second inlet chamber 17b and arranged on a partition wall defining the first outlet chamber 18a and the second inlet chamber 17b (refer to FIG. 3).

The partition wall may be formed by a partition wall forming member 37 of the first housing 30 and a partition wall forming member 27 of the second housing 20. The connection flow path 19 may be formed by cutting at least a portion of the partition wall.

Accordingly, the first outlet chamber 18a and the second inlet chamber 17b may communicate with each other.

The ventilation apparatus 1 may include a connection path opening and closing unit 90 arranged on the connection flow path 19 and configured to open and close the connection flow path 19.

The connection path opening and closing unit 90 may selectively open and close the connection flow path 19 to allow the first outlet chamber 18a and the second inlet chamber 17b to selectively communicate with each other.

The connection path opening and closing unit 90 may be provided in any configuration, such as a valve or a damper, configured to selectively open and close the connection flow path 19 by being controlled by a controller (not shown) to be described later.

The ventilation apparatus 1 may include a first inlet opening and closing unit 91 arranged on the first inlet 11 and configured to selectively open and close the first inlet 11.

The ventilation apparatus 1 may include a controller (not shown) configured to control the ventilation apparatus 1 based on an indoor temperature and/or indoor humidity and/or discharge temperature, and configured to control an operation mode of the ventilation apparatus 1 according to a user's selection.

In a wireless or wired manner, the controller (not shown) may be electrically connected to a temperature sensor configured to measure a temperature of the indoor space I and the outdoor space O and a discharge temperature sensor (not shown) configured to measure a temperature of air discharged from the ventilation apparatus 1, thereby receiving a value that is measured by the sensors.

The ventilation apparatus 1 may be operated in an outdoor dehumidification mode and an indoor dehumidification mode. The outdoor dehumidification mode may additionally be divided into a cooling dehumidification mode and a reheat dehumidification mode. The ventilation apparatus 1 including the dehumidifying unit 80 may be driven in an operation mode automatically selected by a controller (not shown) based on the values measured by each sensor, or in an operation mode selected by the user's selection.

The above-described heat exchanger 81 may be provided in plurality. All of the plurality of heat exchangers may operate as evaporators through the controller (not shown), and at least one of the plurality of heat exchangers may operate as a condenser, and the other heat exchanger may operate as an evaporator.

In the cooling dehumidification mode, an amount of refrigerant delivered to the dehumidifying unit 80 may be adjusted or the plurality of heat exchangers 81 of the dehumidifying unit 80 may operate as evaporators to absorb heat while removing moisture in the air introduced from the outdoor space O. Accordingly, it is possible to provide cooled air to the indoor space I.

In the reheat dehumidification mode, one heat exchanger among the plurality of heat exchangers 81 may operate as a condenser and the other heat exchanger may operate as an evaporator so as to remove moisture in the air introduced from the outdoor space O while maintain the temperature of the air introduced into the ventilation apparatus 1. Accordingly, it is possible to provide cooled air to the indoor space I.

In the outdoor dehumidification mode, as shown in FIG. 11, outside air A3 introduced into the ventilation apparatus 1 through the first inlet 11 may be heat exchanged through the total enthalpy heat exchanger 71 and dehumidified through the dehumidifying unit 80, and then provided to the indoor space I through the first outlet 12.

In this case, the connection path opening and closing unit 90 may be provided in a closed state 90a to prevent the air, which is introduced from the indoor space, from being mixed with the outside air A3.

Further, the first inlet opening and closing unit 91 may be provided in an open state 91a to allow the outside air A3 to flow into the ventilation apparatus 1.

The indoor dehumidification mode may remove moisture in the air introduced from the indoor space I while circulating the air in the indoor space I through the ventilation apparatus 1, thereby supplying the cooled air back to the indoor space I.

As described above, in the outdoor dehumidification mode, when outdoor air flows into the ventilation apparatus 1, the outdoor air may pass through the filter 72, the total enthalpy heat exchanger 71 and the dehumidifying unit 80 arranged inside the ventilation apparatus 1 and then discharged to the indoor space I through the first outlet 12.

In this case, as an amount of air introduced into the ventilation apparatus 1 increases, an amount of foreign substances collected in the filter 72 may increase, and an amount of foreign substances accumulated in the total enthalpy heat exchanger 71 may increase.

Accordingly, the user can periodically draw out the filter 72 and the total enthalpy heat exchanger 71 from the ventilation apparatus 1 through the first hole 35 to clean the filter 72 and the total enthalpy heat exchanger 71, and then insert the filter 72 and the total enthalpy heat exchanger 71 that are cleaned into the ventilation apparatus 1.

That is, as the amount of air passing through the filter 72 and the total enthalpy heat exchanger 71 increases, the user needs to draw out the filter 72 and the total enthalpy heat exchanger 71 from the ventilation apparatus 1 and insert the filter 72 and the total enthalpy heat exchanger 71 to the ventilation apparatus 1 in a shorter cycle. Accordingly, in the use of the ventilation apparatus 1, user inconvenience may occur.

To ease the difficulty, the ventilation apparatus 1 according to an embodiment of the disclosure may reduce the amount of air passing through the filter 72 and the total enthalpy heat exchanger 71 through the indoor dehumidification mode so as to increase a duration, in which the filter 72 and the total enthalpy heat exchanger 71 are contaminated, thereby increasing a cleaning cycle of the filter 72 and the total enthalpy heat exchanger 71.

Particularly, in the indoor dehumidification mode, the ventilation apparatus 1 may prevent the air, which is moved in the indoor space and then introduced into the ventilation apparatus 1 through the second inlet 13, from flowing into the second outlet 14, so as to circulate the air from the inside of the ventilation apparatus 1 to the indoor space through the first outlet 12 again without discharging the indoor air to the outside.

In this case, the ventilation apparatus 1 may be provided to allow the air, which is circulated inside the ventilation apparatus 1, to pass through the dehumidifying unit 80, and thus even when the indoor air is circulated, the ventilation apparatus 1 may dehumidify the air.

Accordingly, in the indoor dehumidification mode, the outdoor air may not be introduced into the ventilation apparatus 1 and thus it is possible to dehumidify the indoor air, which is circulated, while preventing the filter 72 and the total enthalpy heat exchanger 71 from being contaminated by the foreign substances that are introduced from the outside.

In addition, the indoor air may pass through the filter 72 when being introduced from the outside, and thus the indoor air may be already maintained in a clean state. Accordingly, in the circulation of the indoor air, the cleanliness of the indoor air may be maintained. In the indoor dehumidification mode, as shown in FIG. 12, inside air A4, which is introduced into the ventilation apparatus 1 through the second inlet 13, may not flow into the second outlet 14 through the total enthalpy heat exchanger 71 but flow into the second inlet chamber 17b through the connection flow path 19 and pass through the dehumidifying unit 80 and then be circulated into the indoor space I through the first outlet 12. In this case, the connection path opening and closing unit 90 may be provided in an open state 90b to allow the indoor air A4, which is introduced from the indoor space, to flow to the connection flow path 19.

In addition, the first inlet opening and closing unit 91 may be provided in a closed state 91b to prevent outside air from being introduced into the ventilation apparatus 1 and mixed with the indoor air A4.

It is appropriate that the second blower 62 is not driven in the indoor dehumidification mode. This is to prevent that at least a portion of the air introduced into the second inlet 13 does not flow to the connection flow path 19 but flows to the second outlet 14 through the total enthalpy heat exchanger 71 when the second blower 62 is driven.

In response to the indoor dehumidification mode of the ventilation apparatus 1, the controller (not shown) may control the first inlet opening and closing unit 91 to be the closed state 91b while stopping the driving of the second blower 62, and control the connection path opening and closing unit 90 to open the connection flow path 19.

Accordingly, in the indoor dehumidification mode, the ventilation apparatus 1 may allow the indoor air, which is introduced into the ventilation apparatus 1, to pass through the dehumidifying unit 80 without passing through the filter 72 and the total enthalpy heat exchanger 71, and thus the ventilation apparatus 1 may supply the dehumidified air to the indoor space while preventing the contamination of the filter 72 and the total enthalpy heat exchanger 71 caused by the outside air.

In response to a user input or values transmitted from various sensors, the controller (not shown) may control the ventilation apparatus 1 to be driven in the outdoor dehumidification mode. In this case, the controller (not shown) may control the first blower 61 and the second blower 62, respectively, to allow both the first blower 61 and the second blower 62 to be driven. In addition, the controller (not shown) may control the connection path opening and closing unit 90 to maintain the closed state 90a of the connection path opening and closing unit 90.

In response to a user input or values transmitted from various sensors, the controller (not shown) may control the ventilation apparatus 1 to be driven in the indoor dehumidification mode. In this case, the controller (not shown) may control the first blower 61 and the second blower 62, respectively, to allow the first blower 61 to be driven and to allow the second blower 62 not to be driven. In addition, the controller (not shown) may control the connection path opening and closing unit 90 to be the open state 90b. Further, the controller (not shown) may control the first inlet opening and closing unit 91 to be the closed state 91b.

The ventilation apparatus 1 may be driven in either the outdoor dehumidification mode in which the outside air A3 flows into the indoor space I or the indoor dehumidification mode in which the indoor air A4 circulates into the indoor space I.

In any operation mode, the ventilation apparatus 1 may provide dehumidified air to the indoor space I.

Hereinafter a ventilation apparatus 1' according to another embodiment of the disclosure will be described in detail.

Figure 13:
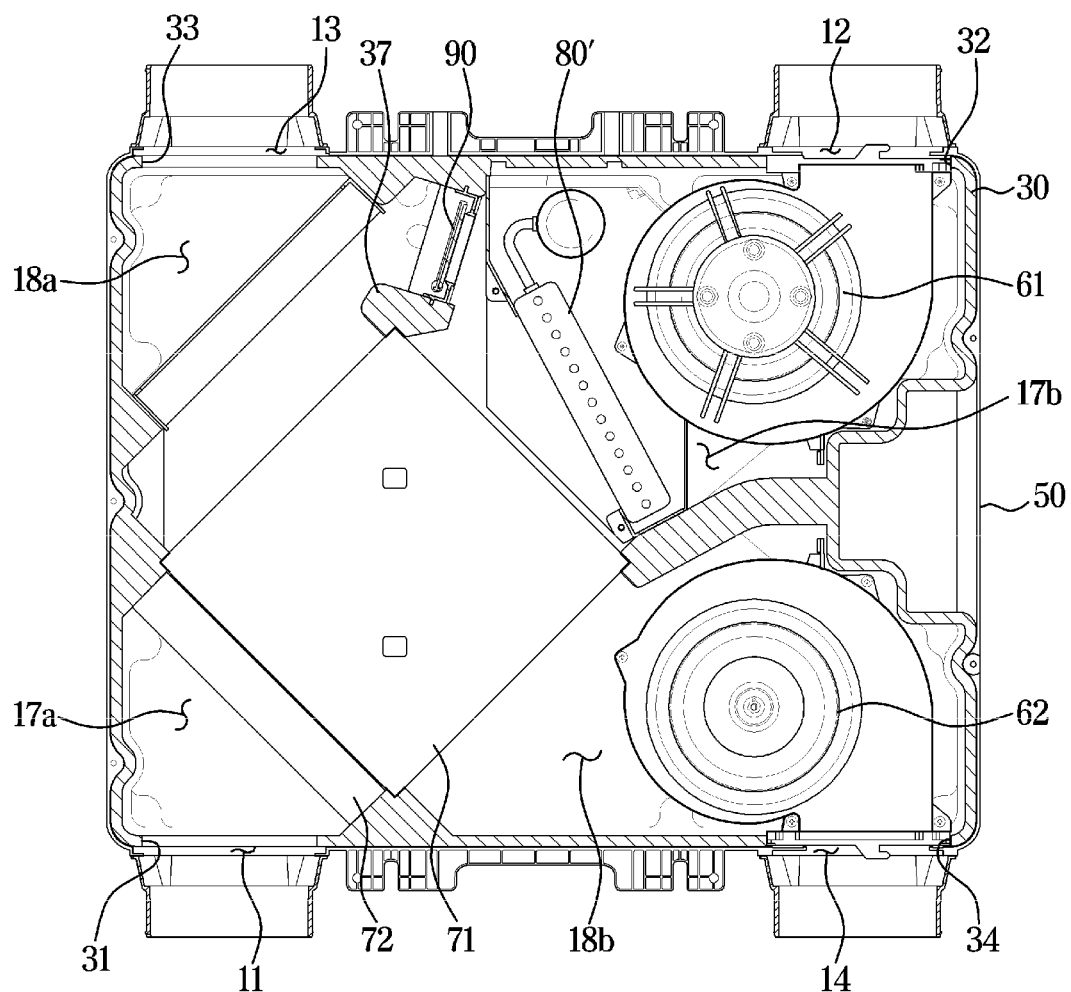
FIG. 13 is a view illustrating a ventilation apparatus according to another embodiment of the disclosure, in a state in which some components of a first type-ventilation apparatus are removed, from the top to the bottom.

FIG. 13 is a view illustrating a ventilation apparatus according to another embodiment of the disclosure, in a state in which some components of a first type-ventilation apparatus are removed, from the top to the bottom.

The ventilation apparatus 1' may include a humidifying unit 80' detachably arranged on the inlet flow path 15 and configured to supply moisture to the air flowing through the inlet flow path 15.

The humidifying unit 80' may be provided to be detachable from the ventilation apparatus 1', and the humidifying unit 80' and the dehumidifying unit 80 may be selectively arranged on the inlet flow path 15.

The dehumidifying unit 80 may be provided to be detachable from the ventilation apparatus 1'. Like the ventilation apparatus 1 according to an embodiment of the disclosure, only the drain tray 82 may be drawn out from the ventilation apparatus 1'. However, the entire dehumidifying unit 80 including the heat exchanger 81 may be drawn out from the ventilation apparatus 1'.

The dehumidifying unit 80 and the humidifying unit 80' may be similarly provided to be drawn out and inserted through the first hole 35 based on the first type-ventilation apparatus 1'.

The humidifying unit 80' may be arranged at a position from which the dehumidifying unit 80 is drawn out. The humidifying unit 80' may include a plurality of nozzles provided to supply moisture to the air and a storage provided to store water.

Accordingly, moisture may be supplied to the air flowing through the inlet flow path 15 and thus air containing a predetermined level of moisture may be discharged into the indoor space I.

That is, according to the environment of the indoor space I, the user selectively combines the dehumidifying unit 80 or the humidifying unit 80' with the ventilation apparatus 1' and the ventilation apparatus 1' may supply air suitable for the environment of the indoor space I.

As is apparent from the above description, a ventilation apparatus may adjust a humidity of outdoor air, which is sucked, by using a heat exchanger arranged on an inlet flow path, and then supply the air to an indoor space. Therefore, the ventilation apparatus may maintain the humidity of the indoor space in a comfortable state.

In a pair of ventilation apparatuses arranged bilateral-symmetrically, configurations forming the ventilation apparatuses are identical to each other, and thus a production cost may be reduced.

A ventilation apparatus may include a connection flow path provided to connect an inlet flow path to an outlet flow path, and an opening and closing unit configured to open and close the connection flow path, and thus the ventilation apparatus may maintain a humidify of indoor space in a predetermined level by circulating indoor air as well outdoor air.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A ventilation apparatus comprising:
 a housing including:
  an inlet flow path along which a flow of outdoor air, introduced through a first inlet, is flowable to an indoor space through a first outlet,
  an outlet flow path along which a flow of indoor air, introduced through a second inlet, is flowable to an outdoor space through a second outlet,
  a connection flow path along which the flow of indoor air is flowable to the inlet flow path,
  a connection path valve configured to selectively open and close to respectively open and close the connection flow path
  a first housing including a first hole through a surface of the first housing, the first hole being asymmetrical with respect to a center line of the housing extending in a long axis direction of the housing or a center line of the housing extending in a short axis direction of the housing, the first hole including:
   a first region adjacent to a first side of the housing rather than to a second side of the housing with respect to a center line of the housing extending along a direction in which the first side and the second side of the housing extend, and a second region, and a second housing coupled to the first housing in an up and down direction and including a second hole through a surface of the second housing, the second hole having a shape corresponding to a shape of the first hole in the up and down direction;

a total enthalpy heat exchanger in the inlet flow path and the outlet flow path and configured exchange heat between the flow of outdoor air and the flow of indoor air, the total enthalpy heat exchanger adjacent to the first side of the housing rather than to the second side of the housing with respect to the center line of the housing extending along a direction in which the first side and the second side of the housing extend;

a heat exchanger in the inlet flow path and configured to remove moisture in air flowing along the inlet flow path; and a drain tray configured to collect condensed water generated by the heat exchanger, wherein the connection flow path is configured to allow the flow of indoor air to pass through the heat exchanger and flow to the first outlet while preventing the flow of indoor air from flowing to the total enthalpy heat exchanger, the first region is configured to allow the total enthalpy heat exchanger to be drawn out to an outside of the housing, and the second region is configured to allow the drain tray to be drawn out to the outside of the housing.

2. The ventilation apparatus of claim 1, wherein the housing is formed of an insulating material.

3. The ventilation apparatus of claim 1, wherein relative to the first inlet, the first outlet, the second inlet, and the second outlet, the total enthalpy heat exchanger is closest to the first inlet.

4. The ventilation apparatus of claim 1, further comprising:

a filter configured to collect foreign substances in the outdoor air introduced through the first inlet, and arranged to face an intake end of the total enthalpy heat exchanger.

5. The ventilation apparatus of claim 4, wherein the connection flow path is configured to allow the flow of indoor air to pass through the heat exchanger and flow to the first outlet while preventing the indoor air from flowing to the total enthalpy heat exchanger and the filter.

6. The ventilation apparatus of claim 1, wherein the housing includes:

a first inlet chamber between the first inlet and the total enthalpy heat exchanger and forming a portion of the inlet flow path;

a second inlet chamber between the first outlet and the total enthalpy heat exchanger and forming another portion of the inlet flow path;

a first outlet chamber between the second inlet and the total enthalpy heat exchanger and forming a portion of the outlet flow path and a second outlet chamber between the second outlet and the total enthalpy heat exchanger and forming another portion of the outlet flow path, and the heat exchanger is in the second inlet chamber.

7. The ventilation apparatus of claim 6, wherein the connection flow path connects the first outlet chamber to the second inlet chamber.

8. The ventilation apparatus of claim 7, further comprising:

a first blower in the inlet flow path and drivable to flow the flow of outdoor air; and a second blower in the outlet flow path and drivable to flow the flow of indoor air, wherein the first blower is in the second inlet chamber and the second blower is in the second outlet chamber.

9. The ventilation apparatus of claim 8, wherein the housing further includes a first inlet valve configured to open and close to respectively open and close the first inlet, and in response to the connection path valve being open so that the connection flow path is open, the first inlet valve is closed so that the first inlet is closed.

10. The ventilation apparatus of claim 9, wherein in response to the connection path valve being open so that the connection flow path is open, the second blower is not driven.

11. The ventilation apparatus of claim 7, wherein at least a portion of the second inlet chamber is formed by the surface of the second housing, and at least a portion of the first outlet chamber is formed by the surface of the second housing, the housing further includes a partition wall between the second inlet chamber and the first outlet chamber, and the partition wall defines at least a portion of the second inlet chamber inside the housing and at least a portion of the first outlet chamber inside the housing, and the connection path valve is on the partition wall.

12. The ventilation apparatus of claim 7, wherein the second inlet chamber has a larger internal space than the first inlet chamber, the first outlet chamber, and the second outlet chamber.

13. The ventilation apparatus of claim 3, wherein the first housing includes:

a first inlet portion forming a portion of the first inlet;

a first outlet portion forming a portion of the first outlet;

a second inlet portion forming a portion of the second inlet; and a second outlet portion forming a portion of the second outlet, and the second housing includes:

a first inlet portion forming another portion of the first inlet;

a first outlet portion forming another portion of the first outlet;

a second inlet portion forming another portion of the second inlet; and a second outlet portion forming another portion of the second outlet, and with respect to the up and down direction of the housing, the first outlet portion of the first housing and the first outlet portion of the second housing are formed symmetrically, the first inlet portion of the first housing and the first inlet portion of the second housing are formed symmetrically, the second outlet portion of the first housing and the second outlet portion of the second housing are formed symmetrically, and the second inlet portion of the first housing and the second inlet portion of the second housing are formed symmetrically.

* * * * *